United States Patent
Imabayashi

(10) Patent No.: US 11,626,976 B2
(45) Date of Patent: Apr. 11, 2023

(54) INFORMATION PROCESSING SYSTEM, INFORMATION PROCESSING DEVICE, INFORMATION PROCESSING METHOD AND INFORMATION PROCESSING PROGRAM

(71) Applicant: EAGLYS Inc., Tokyo (JP)

(72) Inventor: Hiroki Imabayashi, Tokyo (JP)

(73) Assignee: EAGLYS Inc., Tokyo (JP)

( * ) Notice: Subject to any disclaimer, the term of this patent is extended or adjusted under 35 U.S.C. 154(b) by 0 days.

(21) Appl. No.: 17/879,773

(22) Filed: Aug. 3, 2022

(65) Prior Publication Data

US 2022/0385455 A1 Dec. 1, 2022

Related U.S. Application Data

(63) Continuation of application No. PCT/JP2021/005173, filed on Feb. 12, 2021.

(30) Foreign Application Priority Data

Feb. 20, 2020 (JP) .............................. JP2020-027113

(51) Int. Cl.
*H04L 9/08* (2006.01)
*G06F 21/53* (2013.01)

(52) U.S. Cl.
CPC ............ *H04L 9/0822* (2013.01); *G06F 21/53* (2013.01); *H04L 9/0894* (2013.01)

(58) Field of Classification Search
CPC ....... H04L 9/0822; H04L 9/0894; H04L 9/08; H04L 9/14; G06F 21/53; G06F 2221/2107; G06F 21/6218; G06F 21/602
See application file for complete search history.

(56) References Cited

U.S. PATENT DOCUMENTS

| 8,891,772 | B2 * | 11/2014 | D'Souza | H04L 63/061 713/153 |
| 2013/0179684 | A1 * | 7/2013 | Furukawa | G06F 21/602 713/165 |
| 2014/0161251 | A1 * | 6/2014 | Yoshida | H04L 9/14 380/44 |
| 2015/0309831 | A1 * | 10/2015 | Powers | G06F 11/1474 718/1 |

FOREIGN PATENT DOCUMENTS

JP 2011-227193 A 11/2011

OTHER PUBLICATIONS

International Search Report for PCT/JP2021/005173 dated Apr. 27, 2021.
Japanese decision to grant a patent dated Jul. 2, 2021.

* cited by examiner

*Primary Examiner* — Abiy Getachew
(74) *Attorney, Agent, or Firm* — Yokoi & Co., U.S.A.; Toshiyuki Yokoi

(57) ABSTRACT

An information processing system capable of processing the encrypted data efficiently is provided. The information processing system of the present invention includes: a key management unit configured to manage a system key; a storage unit configured to store an encryption data encrypted by the system key; and a processing execution unit configured to temporarily construct a virtual execution environment protected from a standard execution environment and decrypt the encryption data in the virtual execution environment based on the system key acquired from the key management unit.

10 Claims, 15 Drawing Sheets

| personnel document | | | | |
|---|---|---|---|---|
| employee ID | personnel information | | | |
| | score of company entrance exam | salary | assess | ... |
| U001 | 90 | 800 | 70 | ... |
| U002 | 70 | 700 | 65 | ... |
| ... | ... | ... | ... | ... |

A150b

| result document | | | |
|---|---|---|---|
| employee ID | result | | |
| | sales | contract rate | ... |
| U001 | 2000 | 25% | ... |
| U002 | 1800 | 80% | ... |
| ... | ... | ... | ... |

A151

| personnel document | | | | | | | |
|---|---|---|---|---|---|---|---|
| employee ID | personnel information | | | | result | | |
| | score of company entrance exam | salary | assess | ... | sales | contract rate | ... |
| U001 | 90 | 800 | 70 | ... | 2000 | 25% | ... |
| U002 | 70 | 700 | 65 | ... | 1800 | 80% | ... |
| ... | ... | ... | ... | ... | ... | ... | ... |

INFORMATION PROCESSING SYSTEM, INFORMATION PROCESSING DEVICE, INFORMATION PROCESSING METHOD AND INFORMATION PROCESSING PROGRAM

TECHNICAL FIELD

The present disclosure relates to an information processing system, an information processing device, an information processing method and an information processing program.

BACKGROUND ART

In the situation where secret data such as personal information is managed on a cloud server, in order to utilize information while preventing information leakage from the cloud server, an encryption technology capable of storing the data on the cloud server in a state that the data is preliminarily encrypted and performing a calculation in the encrypted state when using an encryption data stored in the cloud server is conventionally known. For example, Patent Document 1 discloses secure computing technology based on public key encryption using a cryptographic function having a homomorphic property to addition and subtraction and capable of performing the calculation of addition, subtraction, multiplication and division in the encrypted state.

PRIOR ART DOCUMENTS

Patent Documents

Patent Document 1: Japanese Patent Application Laid-Open No. 2011-227193

DISCLOSURE OF THE INVENTION

Problems to be Solved by the Invention

When the homomorphic encryption scheme is used as shown in Patent Document 1, the encrypted text of the calculation result after addition and subtraction can be acquired by adding or subtracting the encrypted text without decrypting the encrypted text. However, the encrypted text encrypted by the cryptographic function having a homomorphic property has an extremely large size although reliability is high. Thus, the calculation amount is enormous and it is not easy to apply it for a practically used system.

Accordingly, the present disclosure is made for solving the above described problem and the purpose of the present disclosure is to provide a calculation device (arithmetic device) capable of calculating the encrypted data efficiently.

Means for Solving the Problem

In order to achieve the above described purpose, the information processing system of the present disclosure includes: a key management unit configured to manage a system key; a storage unit configured to store an encryption data encrypted by the system key; and a processing execution unit configured to temporarily construct a virtual execution environment protected from a standard execution environment and decrypt the encryption data in the virtual execution environment based on the system key acquired from the key management unit.

In order to achieve the above described purpose, the information processing device of the present disclosure includes: a key management unit configured to manage the system key; a storage unit configured to store the encryption data encrypted by the system key; and a processing execution unit configured to temporarily construct a virtual execution environment protected from a standard execution environment and decrypt the encryption data in the virtual execution environment based on the system key acquired from the key management unit.

In order to achieve the above described purpose, the information processing method of the present disclosure is the method executed in a computer having a controller and a storage unit, the method including: a step of managing a system key by the controller; a step of storing an encryption data encrypted by the system key in the storage unit; and a step of temporarily constructing a virtual execution environment protected from a standard execution environment and decrypting the encryption data in the virtual execution environment based on the system key by the controller.

In order to achieve the above described purpose, the information processing program of the present disclosure makes the computer execute the information processing method.

Effects of the Invention

By using the present disclosure, the encrypted data can be processed efficiently.

BRIEF DESCRIPTION OF THE DRAWINGS

FIG. 15 is a drawing explaining the processing of integration.

MODES FOR CARRYING OUT THE INVENTION

Hereafter, the embodiments of the present disclosure will be explained with reference to the drawings. In all drawings explaining the embodiments, the same reference signs are assigned to the common component to omit the repeated explanation. Note that the following embodiments do not unreasonably limit the content of the present disclosure described in the claims. In addition, all components disclosed in the embodiments are not necessarily essential components of the present disclosure.

First Example (Configuration of Information Processing System 1)

Figure 1:
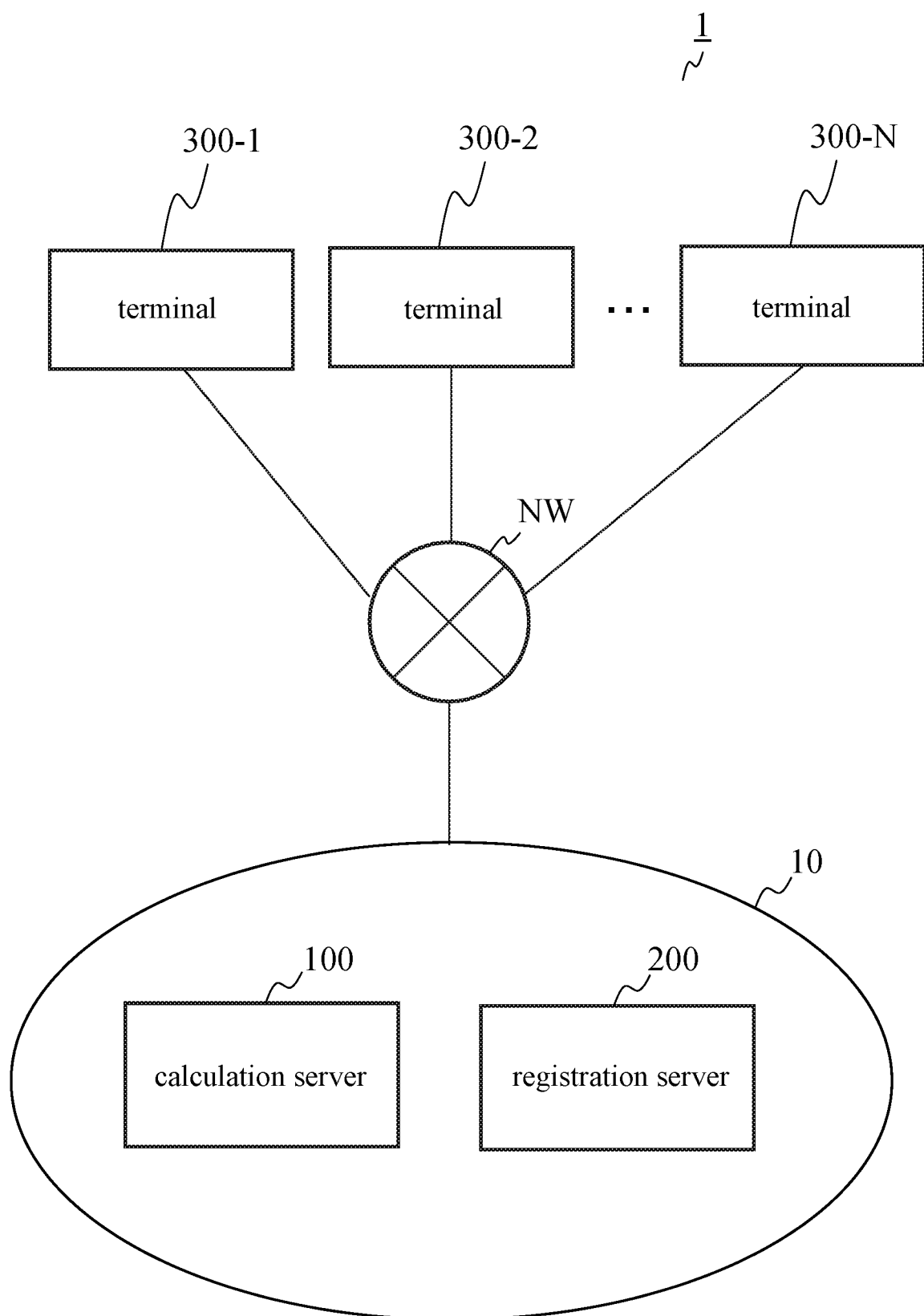
FIG. 1 is a drawing showing a configuration of an information processing system 1.

FIG. 1 is a drawing showing a configuration of an information processing system 1 of the present embodiment. The configuration of the information processing system 1 concerning the first embodiment will be explained with reference to FIG. 1.

The information processing system 1 has a data center 10 and terminals 300-1, 300-2, - - - , 300-N(N is natural number) and they are communicatively connected with each other via a network NW. The network NW is, for example, WAN (Wide Area Network), LAN (Local Area Network) or the like. However, the network NW can be comprised of arbitrary network. Note that the terminals 300-1, 300-2, - - - , 300-N are referred to as a terminal 300 in the following explanation unless they should be particularly distinguished. In addition, although the data center 10 is connected with the terminal 300 or the like via the network NW in the present embodiment, the configuration is not limited to the above described configuration. The information processing system 1 can have the terminal 300 or the like locally connected with the data center 10.

The data center 10 provides a calculation process to a user or the like who uses the information processing system 1. The data center 10 has a calculation server 100 and a registration server 200. The calculation server 100 corresponds to the calculation device for performing a calculation for an encryption data. The calculation server 100 performs a calculation for the encryption data in accordance with a calculation processing request received from the terminal 300 or the like connected with the network NW. The registration server 200 performs a preliminary registration process for enabling the above described user to use the information processing system 1.

The terminal 300 is an information processing device used by the above described user. The terminal 300 is, for example, a PC (Personal Computer), a smart phone, a tablet terminal, a wearable terminal such as a head mount display, an AR (Augmented Reality) device, a VR (Virtual Reality) device and an MR (Mixed Reality) device. The terminal 300 applies for utilization to the registration server 200 and requests the calculation process to the calculation server 100.

(Function Configuration of Calculation Server 100)

Figure 2:
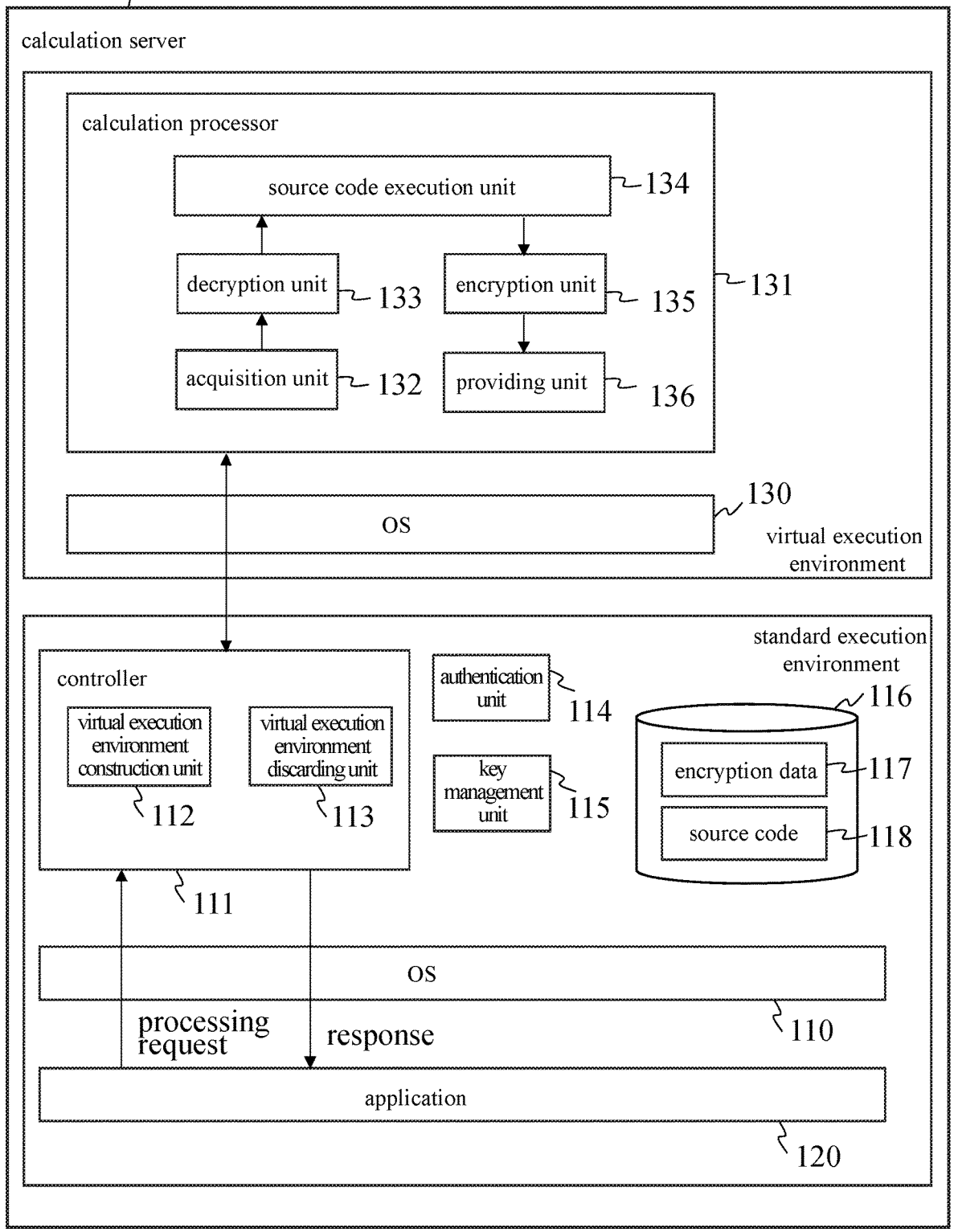
FIG. 2 is a functional block diagram showing an example of a function configuration of a calculation server 100.

FIG. 2 is a functional block diagram showing an example of a function configuration of the calculation server 100. An example of the function configuration of the calculation server 100 will be explained with reference to FIG. 2.

The calculation server 100 is equipped with an OS (Operating System) 110, and an application 120 is operated on the OS 110. The OS 110 has a controller 111, an authentication unit 114, a key management unit 115 and a storage unit 116. Here, in the OS 110, the programs installed in the OS and the environment used for executing the applications or the like are referred to as "standard execution environment."

The controller 111 has a virtual execution environment construction unit 112 and a virtual execution environment discarding unit 113. The controller 111 performs a calculation process by receiving the calculation processing request for a later described encryption data 117 from the application 120 using the encryption data 117.

The virtual execution environment construction unit 112 constructs a virtual execution environment protected from the standard execution environment in accordance with the calculation processing request. Namely, only the authenticated user can access the virtual execution environment from the standard execution environment. Although the virtual execution environment is implemented as a part of the OS 110 in the present embodiment, the method for constructing the virtual execution environment is not particularly limited. The virtual execution environment can be implemented as an application or implemented as a module in the application. In addition, the virtual execution environment can share the memory portion of the hardware with the standard execution environment, although it is also possible not to share the memory portion. Although the virtual execution environment is substantially expressed as a predetermined data, the virtual execution environment can be used as a virtualized application server or the like when executed on the OS 110.

The virtual execution environment discarding unit 113 discards (eliminates) the above described virtual execution environment. For example, the virtual execution environment is discarded by deleting a predetermined data expressing the virtual execution environment. The virtual execution environment discarding unit 113 can discard the virtual execution environment when a predetermined time elapses after a later described source code execution unit 134 starts executing the source code. Alternatively, the virtual execution environment discarding unit 113 can discard the virtual execution environment after a later described providing unit 136 provides the encrypted calculation result. Alternatively, the virtual execution environment discarding unit 113 can discard the virtual execution environment in accordance with an instruction from the user authenticated by a later described authentication unit 114. Alternatively, the virtual execution environment can be discarded at a predetermined periodical timing. Note that the time (period) until discarding the virtual execution environment is preferably between several seconds and several minutes. However, the time (period) can be appropriately determined depending on the processing amount or the like.

Namely, the virtual execution environment for performing the calculation for the encryption data by executing the source code is a one-time (disposable) execution environment. Even when the access to the execution environment is limited, a hacker (e.g., unauthenticated, illegal user) can easily access the execution environment if sufficient time is given. Therefore, in the present embodiment, the calculation is performed in the one-time virtual execution environment. Thus, the risk of being accessed by a hacker is reduced, and security is improved.

The authentication unit 114 authenticates whether or not the user is a secure user who can securely access the virtual execution environment. For example, the authentication unit 114 has an authorization database for storing the identification information (ID) for identifying the user and the authentication information in association with each other. Thus, the authentication unit 114 authenticates the user registered for using the information processing system 1 (i.e., the user who has finished the use registration). Note that the authentication information can be changed based on the intention of the user. Alternatively, the authentication information can be changed per a predetermined period. In addition, the authentication information can be a one-time password (One Time Password: OTP) which is updated per a predetermined period or updated each time when the virtual execution environment is constructed. The OTP is generated from random numbers, characters, symbols and the like calculated by a function depending on the time, for example. However, the method is not limited to the above described method. The OTP can be generated by other methods. The OTP can be transmitted from the authentication unit 114 to an e-mail address or an SNS (Short Message Service) of the user each time when the authentication is requested by the user, for example. In this case, the OPS cannot be acquired unless the user has a browsing authority for browsing the e-mail or the SNS. Thus, the security can be further improved.

The key management unit 115 has a key database for storing the ID of the user and the system key used for encrypting the data in the information processing system 1 in association with each other. The key management unit 115 can generate the system key and register the system key in the key database when the use registration is executed by the user, for example. Note that the key management unit 115 can be provided on the OS different from the OS 110 in the calculation server 100. In addition, the system key can be generated at the user side via the network NW and registered in the key database of the key management unit 115 by the method in which security is secured. The method in which security is secured is not limited to the method of using the conventionally known technology such as a public key algorithm, for example. The documents or face to face communication can be also used.

The storage unit 116 stores encryption data 117 and source code 118. The encryption data 117 is the data encrypted by the above described system key. In the present embodiment, the data to be encrypted is the data such as personal information requiring the consideration in terms of privacy, for example. However, the data to be encrypted is not limited to the above described data. For example, the data generated to include the encrypted data or any data can be encrypted.

The source code 118 is a source code used for the calculation. The source code 118 is a program for executing the calculation for the data generated by decrypting the encryption data 117 by using the system key. The encryption data 117 and the source code 118 can be transmitted from the terminal 300 to the calculation server 100 via the network NW. Alternatively, the encryption data 117 and the source code 118 can be acquired from a storage medium or the like. Alternatively, the encryption data 117 and the source code 118 can be preliminarily stored in the storage unit 116.

The source code 118 can be an algorithm for generating a learning model based on the encryption data 117. For example, a correlation or the like is extracted for the decrypted encryption data 117 and a learning model is generated as a calculation result.

The application 120 is an application working on the OS 110. For example, the application 120 analyzes and cryptanalyzes the encrypted data. When the application 120 invokes (calls) a calculation API (Application Program Interface), the calculation processing request is outputted to the controller 111. The virtual execution environment construction unit 112 of the controller 111 constructs the above described virtual execution environment in accordance with the calculation processing request.

The virtual execution environment is equipped with an OS 130. The OS 130 has a calculation processor 131. The controller 111 forms a secure communication channel between the OS 110 and the OS 130. For example, the virtual execution environment can be constructed so that the virtual execution environment preliminarily includes a session key for encrypting the data transmitted and received between the OS 110 and the OS 130. Alternatively, the session key generated in the OS 130 or the OS 110 can be shared by using the conventionally known technology such as a public key algorithm. In the present embodiment, the data is transmitted and received between the OS 110 and the OS 130 through the above described secure communication channel. However, it is possible not to encrypt the already encrypted data by using the session key. Consequently, the burden of the process can be reduced.

The calculation processor 131 is a calculation program installed in the OS 130, for example. The calculation processor 131 includes an acquisition unit 132, a decryption unit 133, a source code execution unit 134, an encryption unit 135 and a providing unit 136.

The acquisition unit 132 corresponds to an encryption data acquisition unit, a source code acquisition unit and a key acquisition unit. The acquisition unit 132 acquires the encryption data 117 and the source code 118 from the storage unit 116 and acquires the system key from the key management unit 115.

The decryption unit 133 decrypts the encryption data 117 by using the system key acquired by the acquisition unit 132.

The source code execution unit 134 executes the source code 118 to the decrypted encryption data 117.

The encryption unit 135 encrypts the calculation result executed by the source code execution unit 134. The encryption unit 135 can encrypt the calculation result by using the system key acquired by the acquisition unit 132. Alternatively, the encryption unit 135 can encrypt the calculation result by using a different key different from the system key instead of the system key. For example, the key management unit 115 can generate the system key and a different key (system key) which is different from the system key, and the acquisition unit 132 can acquire these keys and transmit these keys to the encryption unit 135. In addition, the acquisition unit 132 can acquire a different key which is different from the system key generated in a key generation unit (not shown in FIG. 2) of the calculation processor 131 and transmit the different key to the encryption unit 135. Consequently, the access authority to the calculation result can be managed by giving the above described different key only to the user permitted to access the calculation result, for example.

The providing unit 136 provides the encrypted calculation result to the standard execution environment, or the like. For example, the encrypted calculation result can be stored in the storage unit 116. Alternatively, the encrypted calculation result can be outputted to the application 120 as a response to the processing request. Note that the providing unit 136 can provide a different key (system key) which is different from the system key generated in the above described key generation unit to the standard execution environment.

After the encrypted calculation result is provided, the virtual execution environment is discarded. Note that although the virtual execution environment discarding unit 113 is provided on the OS 110 in the present invention, the virtual execution environment discarding unit 113 can be provided on the OS 130 instead of the OS 110. Alternatively, the virtual execution environment discarding unit 113 can be provided on the OS 110 and the OS 130.

As described above, in the calculation process of the present embodiment, when the application 120 invokes the calculation API, the virtual execution environment construction unit 112 of the controller 111 constructs the virtual execution environment protected from the standard execution environment and entrusts the calculation process for the encryption data to the calculation processor 131 of the OS 130. The calculation processor 131 decrypts the encryption data, performs the calculation on the decrypted encryption data, encrypts the calculation result, and provides the encrypted calculation result to the standard execution environment. Since the calculation process is performed for the decrypted encryption data (raw data), processing efficiency can be improved compared to the calculation using the homomorphic encryption or the like in which the calculation can be performed in the encrypted state. In addition, since the data is decrypted and the calculation process is performed in the virtual execution environment protected from the standard execution environment, the access from the unauthenticated user can be prevented and the security is ensured.

In addition, since the virtual execution environment is a one-time (disposable) execution environment which is discarded in a predetermined timing after the source code is executed, the risk of the illegal acquisition of the encryption key is reduced by preventing the attack to the OS 130 which is the virtual execution environment and the security can be improved. In addition, since the construction of the virtual execution environment of the present embodiment can be achieved only by a software technology, additional hardware is not required and the operation cost can be reduced.

(Function Configuration of Registration Server 200)

Figure 3:
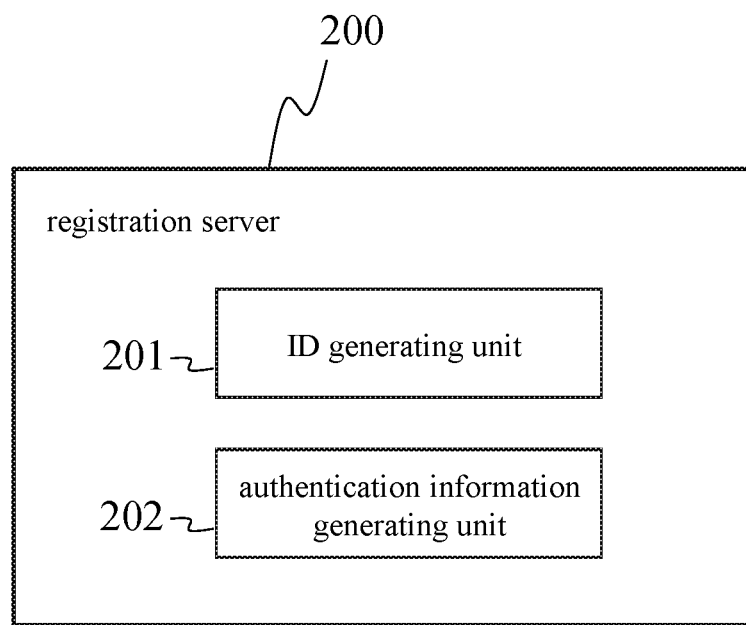
FIG. 3 is a functional block diagram showing an example of a function configuration of a registration server 200.

FIG. 3 is a functional block diagram showing an example of a function configuration of the registration server 200. An example of the function configuration of the registration server 200 will be explained with reference to FIG. 3.

The registration server 200 has an ID generating unit 201 and an authentication information generating unit 202. The ID generating unit 201 generates an identification information (ID) for identifying the user in accordance with a utilization application of the user. The authentication information generating unit 202 generates the authentication information of the user. For example, a password is generated as the authentication information by a random number generator or the like.

(Process in Registration Server 200)

Figure 4:
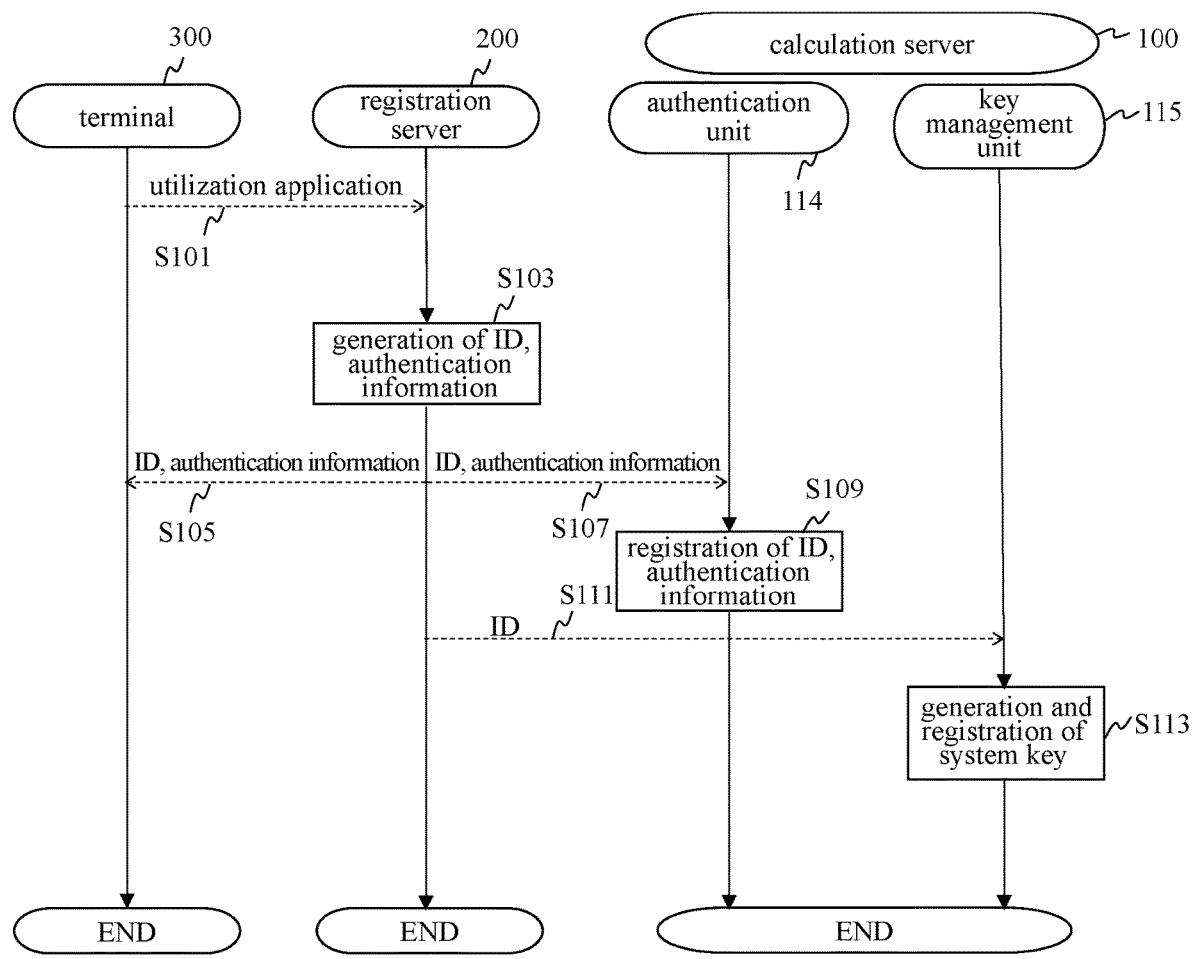
FIG. 4 is a sequence diagram showing an example of the process in the registration server 200.

FIG. 4 is a sequence diagram showing an example of the process in the registration server 200. The use registration process to the information processing system 1 of the present embodiment will be explained with reference to FIG. 4. Note that the use registration is performed by the method in which security is secured as explained above in the terminal 300, the registration server 200 and the calculation server 100.

In Step S101, the terminal 300 applies for utilization to the registration server 200.

In Step S103, the registration server 200 generates the ID for identifying the user and the authentication information.

In Step S105, the terminal 300 acquires the ID and the authentication information generated in Step S103. For example, the terminal 300 can receive the ID and the authentication information from an operating company of the information processing system 1 by a written document. Alternatively, the terminal 300 can receive the ID and the authentication information by using the conventionally known technology such as a public key algorithm.

In Step S107, the authentication unit 114 of the calculation server 100 acquires the ID and the authentication information by the method in which security is secured similar to Step S105.

In Step S109, the authentication unit 114 registers the ID and the authentication information in the authorization database in association with each other.

In Step S111, the key management unit 115 acquires the ID of the user.

In Step S113, the key management unit 115 generates the system key corresponding to the ID of the user and registers the ID and the system key in the key database in association with each other.

(Authentication Process in Calculation Server 100)

Figure 5:
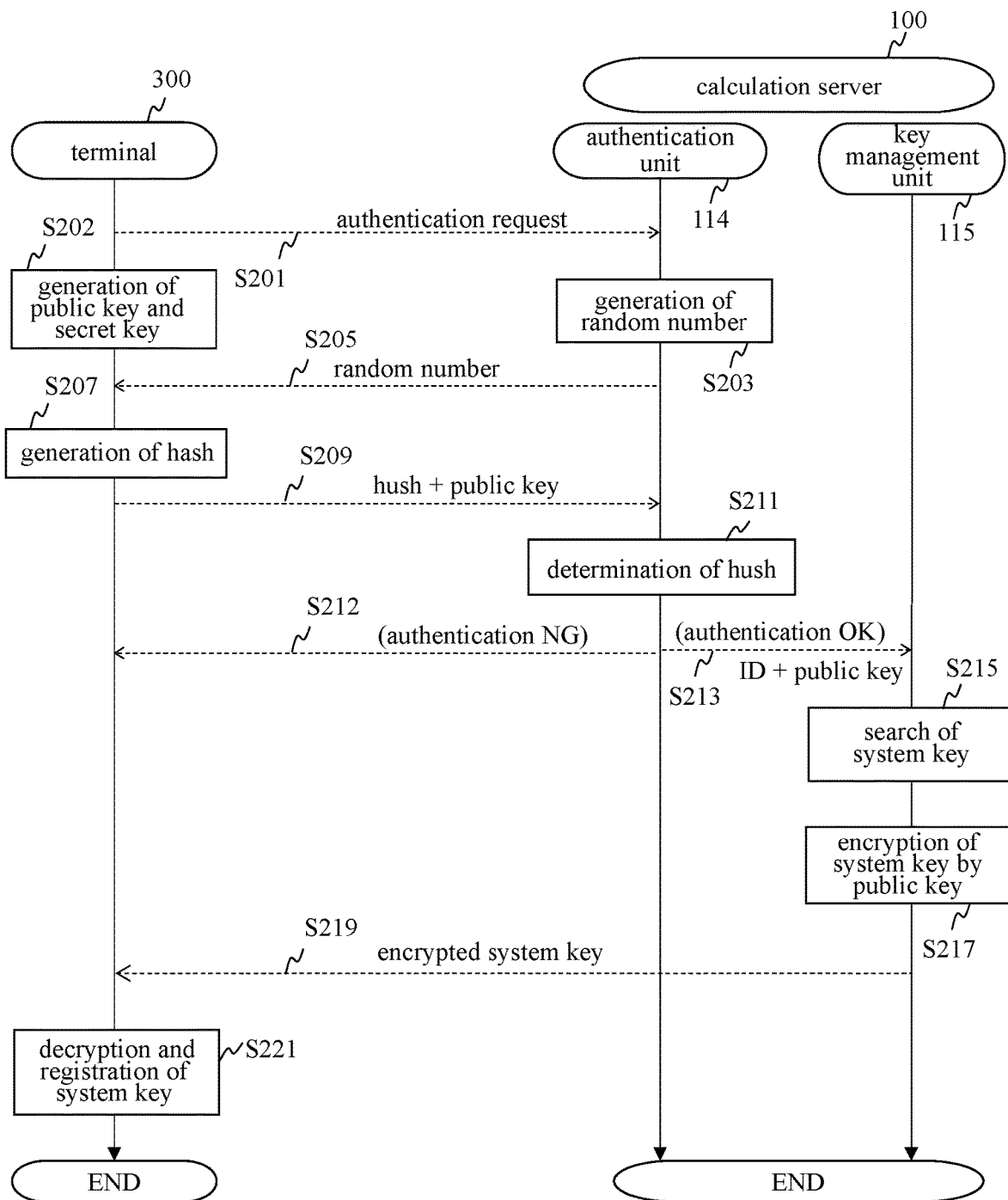
FIG. 5 is a sequence diagram showing an example of an authentication process in the calculation server 100.

FIG. 5 is a sequence diagram showing an example of the authentication process in the calculation server 100. The authentication process in the calculation server 100 will be explained with reference to FIG. 5. Note that the order of the processing steps shown in FIG. 5 is merely an example. In addition, it goes without saying that the authentication method and sharing method of the system key are not limited to the method explained below.

In Step S201, the terminal 300 transmits the ID of the user who uses the terminal 300 to the calculation server 100 together with an authentication request. In addition, in Step S202, the terminal 300 generates own public key and secret key.

In Step S203, the authentication unit 114 generates a random number in accordance with the authentication request. In Step S205, the authentication unit 114 transmits the random number to the terminal 300.

In Step S207, the terminal 300 generates a hash by connecting the received random number and the authentication information acquired by the above described use registration.

In Step S209, the terminal 300 transmits the information including the generated hush and public key to the authentication unit 114.

In Step S211, the authentication unit 114 reads the authentication information corresponding to the ID received together with the authentication request in Step S201 and generates the hush by connecting the read authentication information and the random number generated in Step S203. Then, the authentication unit 114 determines whether or not the hush received from the terminal 300 is identical to the hush generated by the authentication unit 114.

When the hush is not identical, the authentication unit 114 determines that the user who requested authentication is the unregistered user and informs the fact that the authentication is failed in Step S212. On the other hand, when the hush is identical, the authentication unit 114 determines that the user who requested authentication is the authenticated user and transmits the ID of the user and the public key received in Step S209 to the key management unit 115 in Step S213.

In Step S215, the key management unit 115 searches the system key corresponding to the ID in the key database.

In Step S217, the key management unit 115 encrypts the searched system key by the public key received in Step S213. In Step S219, the key management unit 115 transmits the encrypted system key to the terminal 300.

In Step S221, the terminal 300 decrypts the encrypted system key by using the secret key generated in Step S202 and registers the system key. The terminal 300 encrypts the data treated when requesting the calculation process in the calculation server 100 by using the system key in the information processing system 1.

Note that although the system key is generated by the key management unit 115 in the present embodiment, the system key can be generated at the terminal 300 side and shared with the key management unit 115.

(Calculation Process in Calculation Server 100)

Figure 6:
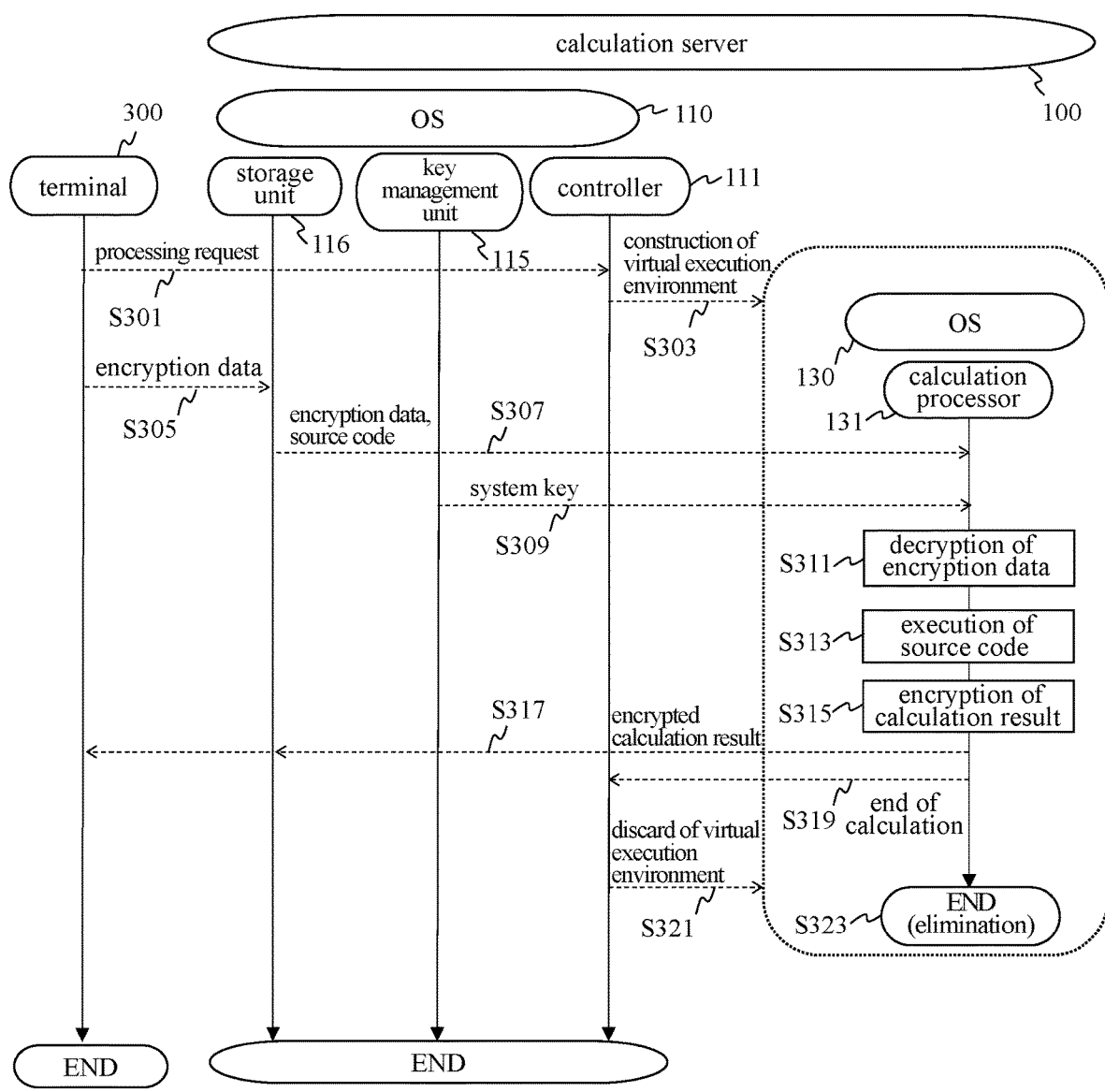
FIG. 6 is a sequence diagram showing an example of a calculation process in the calculation server 100.

FIG. 6 is a sequence diagram showing an example of the calculation process in the calculation server 100. The calculation process in the calculation server 100 will be explained with reference to FIG. 6. Note that the order of the processing steps shown in FIG. 6 is merely an example. It goes without saying that the calculation process is not limited to the processing steps explained below. In FIG. 6, the terminal 300 is the terminal 300 authenticated by the steps shown in FIG. 5.

In Step S301, the terminal 300 requests a calculation processing (processing request of calculation) to the calculation server 100. For example, the terminal 300 invokes the calculation API and requests the calculation processing to the controller 111. Note that the processing can be requested from the application operated on the OS 110.

In Step S303, the controller 111 constructs the virtual execution environment in accordance with the processing request.

In Step S305, the terminal 300 transmits the encryption data to the calculation server 100 and the storage unit 116 stores the encryption data. Note that the source code is preliminarily stored in the storage unit 116 in the example shown in FIG. 6.

In Step S307, the calculation processor 131 acquires the encryption data and the source code from the storage unit 116.

In Step S309, the calculation processor 131 acquires the system key from the key management unit 115.

In Step S311, the calculation processor 131 decrypts the encryption data by using the system key. In Step S313, the calculation processor 131 executes the source code to the decrypted encryption data.

In Step S315, the calculation processor 131 encrypts the calculation result to which the source code is executed by using the system key. In Step S317, the encrypted calculation result is transmitted to the terminal 300. Note that the encrypted calculation result can be stored in the storage unit 116.

In Step S319, the calculation processor 131 notifies the controller 111 that the encrypted calculation result is provided.

In Step S321, the controller 111 discards the virtual execution environment in Step S319 in accordance with the reception of the notification notifying that the encrypted calculation result has already provided.

(Hardware Configuration Diagram)

Figure 7:
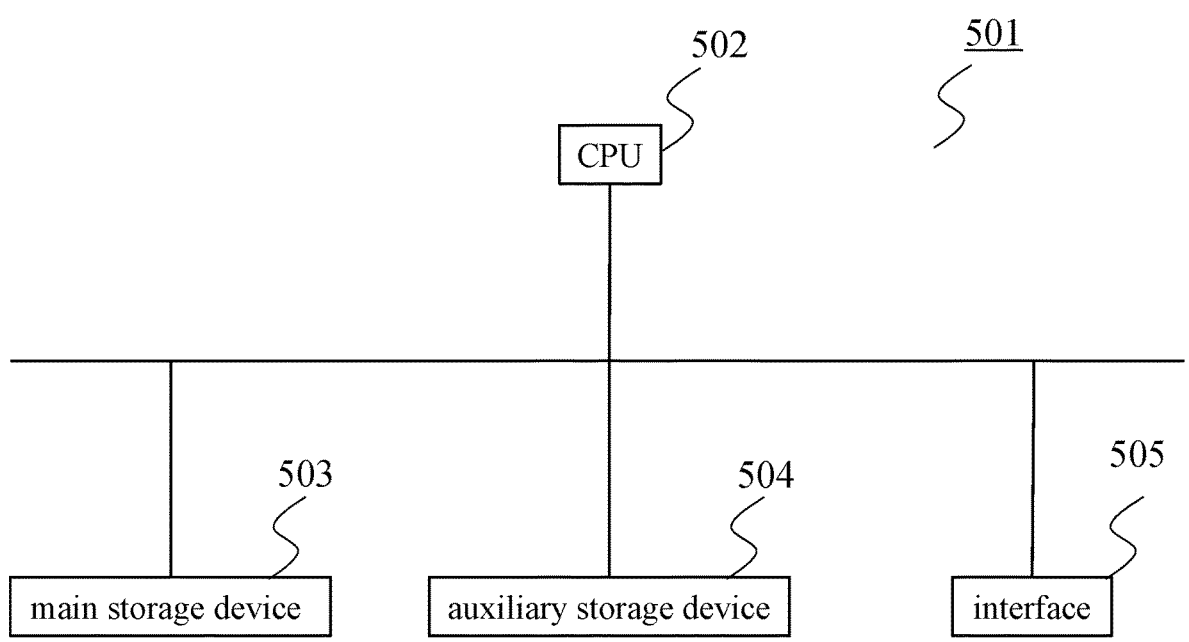
FIG. 7 is a block diagram showing a hardware configuration of the calculation server 100.

FIG. 7 is a block diagram showing the hardware configuration of the calculation server 100. The calculation server 100 is implemented on a computer 501. The computer 501 has a CPU 502, a main storage device 503, an auxiliary storage device 504 and an interface 505.

The operations of components of the calculation server 100 are stored in the auxiliary storage device 504 as a format of the program. The CPU 502 reads the programs from the auxiliary storage device 504, expands the programs to the main storage device 503 and executes the above described processes in accordance with the programs. In addition, the CPU 502 secures a storage area in the main storage device 503 in accordance with the programs. Specifically, the programs are the programs for performing the calculation for the encryption data in the computer 501.

Note that the auxiliary storage device 504 is an example of a non-temporary concrete medium. Other examples of the non-temporary concrete medium can be a magnetic disk, a magneto optic disk, a CD-ROM, a DVD-ROM and a semiconductor memory which are connected via the interface 505. In addition, when the programs are distributed to the computer 501 via the network, the computer 501 that receives the programs can extract the programs in the main storage device 503 and execute the processes.

In addition, the programs can be prepared for achieving only a part of the above described functions. Furthermore, the programs can be a so-called difference file (difference program) for achieving the above described functions while combined with the other programs already stored in the auxiliary storage device 504. Note that the hardware configuration shown in FIG. 7 can be used also for the registration server 200 and the terminal 300. Same as the above described calculation server 100, the operations of components of the registration server 200 and the terminal 300 are also achieved by the CPU which is operated in accordance with the programs stored in the auxiliary storage device.

Explanation of Effect

As described above, in the present embodiment, the virtual execution environment protected from the standard execution environment is constructed, and the calculation process for the encryption data is executed in the virtual execution environment. In the virtual execution environment, the encryption data is decrypted and the calculation is performed for the decrypted encryption data. Then, the calculation result is encrypted and provided to the standard execution environment. Since the calculation process is performed for the decrypted encryption data (raw data), processing efficiency can be improved compared to the calculation using the homomorphic encryption or the like in which the calculation can be performed in the encrypted state. In addition, since the data is decrypted and the calculation process is performed in the virtual execution environment protected from the standard execution environment, the access from the unauthenticated user can be prevented and the security is ensured.

In addition, since the virtual execution environment is a one-time (disposable) execution environment which is discarded in a predetermined timing after the source code is executed, the risk of the illegal acquisition of the encryption key is reduced by preventing the attack to the OS which is the virtual execution environment and the security can be improved. In addition, since the construction of the virtual execution environment of the present embodiment can be achieved only by a software technology, additional hardware is not required and the operation cost can be reduced.

First Variation Example of First Embodiment

In the above described calculation server 100, the key management unit 115 can manage a system key of a common key encryption system and a public key encryption system. Namely, the key management unit 115 can manage a common key and a system key which is a pair of a public key and a secret key (a system public key and a system secret key) to share them with the terminal 300 used by a user. Note that the key management unit 115 can manage the system key which is not associated with the user. Thus, the system key can be associated with the user permitted to access the encryption data afterward.

The terminal 300 encrypts the data (e.g., sensitive data) requiring the consideration of privacy based on the system key and the data is transmitted to the calculation server 100 as the encryption data 117. The terminal 300 encrypts the data by using the common key encryption system such as AES and a common key encryption based retrievable encryption or the public key encryption system such as a homomorphic encryption (HE: Homomorphic Encryption) based on the attribute (e.g., contents of the string and variable) of the data to be encrypted, for example. The encryption system is not limited to the above described examples. The cryptographic technology shown in "e-Government Recommended Ciphers List (CRYPTREC ciphers list)" developed by Ministry of Internal Affairs and Communications and Ministry of Economy can be also used. The encryption data 117 is decrypted in the virtual execution environment by the decryption unit 133 based on the system key and the source code 118 is executed on a plaintext data.

The source code 118 is a calculation algorithm for processing the plaintext data. The source code 118 is executed on the encryption data 117 decrypted in the virtual execution environment. Thus, the secret calculation processing of the encryption data 117 can be accelerated. The source code execution unit 134 executes the source code for generating the data in which the condition branching destination for the comparison operation and the data analysis of the key data is decided or the data formed by the sort or other operations about the decrypted encryption data 117, for example. Namely, as for the encryption data which requires a long processing time for the calculation in an encrypted state encrypted by the homomorphic encryption or the like, the encryption data is decrypted in the temporarily constructed virtual execution environment and the calculation is executed in the virtual execution environment to accelerate the processing speed.

The encryption unit 135 encrypts the calculation result based on the system key and the encrypted calculation result is provided to the standard execution environment. The encryption unit 135 performs the encryption using the encryption system of the common key system or the public key system. The terminal 300 can decrypt the encrypted calculation result based on the system key to use the calculation result. Note that the system key used in the encryption unit 135 can be different from the system key shared with the terminal 300 transmitting the encryption data 117. The key for encrypting the calculation result is managed and the key is given only to the authenticated or permitted user. Thus, the access to the calculation result can be easily controlled.

It is also possible that the virtual execution environment discarding unit 113 discards the virtual execution environment together with the encryption data 117 after the decryption unit 133 decrypts the encryption data 117 based on the instruction of the user authenticated by the authentication unit 114, for example. Since only the authenticated user accesses the virtual execution environment, the user can check and analyze the content of the decrypted encryption data 117 in a secured environment. In addition, since the decrypted encryption data 117 is discarded together with the virtual execution environment without providing the decrypted encryption data 117 to the standard execution environment, there is no risk of information leakage.

Second Variation Example of First Embodiment

In the above described calculation server 100, it is also possible that a plurality of encryption data is decrypted and a plurality of decrypted encryption data is integrated into one in the virtual execution environment. Namely, the source code 118 can be the algorithm for performing the processing of integrating a plurality of data into one data. The integration means the operation of horizontally or vertically connecting two or more database tables having the common key using the common key as "integration key."

FIG. 15 is a drawing explaining the processing of the integration. In the example of FIG. 15, a personnel document (table) A150a and a result document (table) A150b are connected by using the common key of "employee ID" as the integration key to generate an integration document (table) A151. Note that the example of FIG. 15 is merely an example of the processing of "integration." The method of integrating the data is not limited to the above described method.

Second Embodiment

A calculation server 400 concerning the present embodiment is different from the calculation server 100 of the first embodiment in the point that a detection unit for detecting an illegal access to the virtual execution environment is provided.

Figure 8:
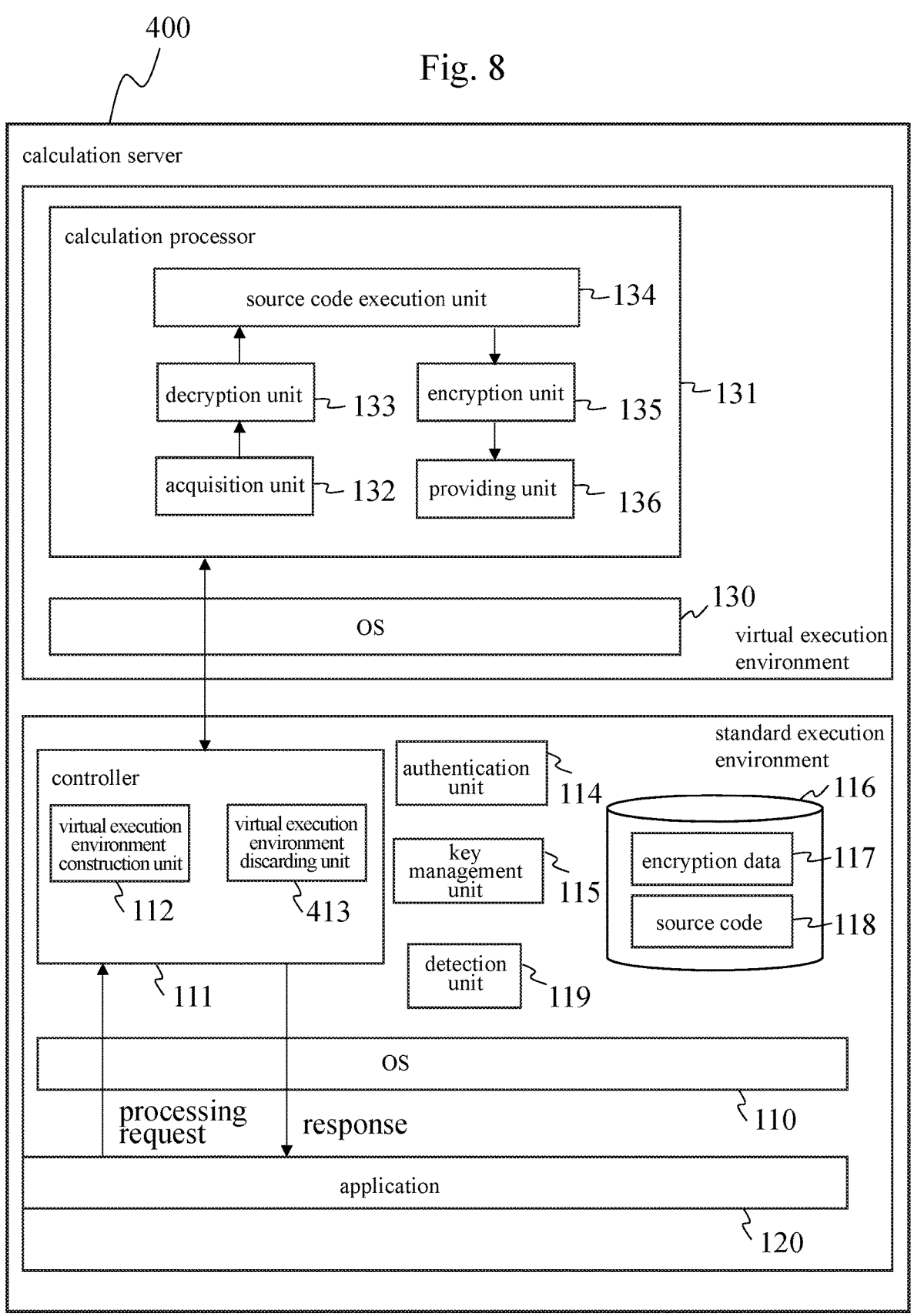
FIG. 8 is a functional block diagram showing an example of a function configuration of a calculation server 400.

FIG. 8 is a functional block diagram showing an example of the function configuration of the calculation server 400. The calculation server 400 is different from the calculation server 100 of the first embodiment shown in FIG. 2 in the point that a detection unit 119 is provided and a virtual execution environment discarding unit 413 is provided instead of the virtual execution environment discarding unit 113. Hence, the explanation of the common configuration will be omitted.

The OS 110 has the detection unit 119 for detecting an illegal access to the virtual execution environment. The detection unit 119 is, for example, a program operated on the OS 110. The detection unit 119 can detect the access request for writing or deleting various resources (e.g., file, registry, kernel data structure) required for operating the programs or the like on the OS 110 as the illegal access. In addition, the detection unit 119 can detect, for example, the hacking of the user account, the access from the different IP address, attempt for the ID or the authentication information exceeding a predetermined number of times within a predetermined period, and the interruption of the program not designated by the user as the illegal access. The illegal access can be detected by using the conventionally known technologies without being limited to the above described examples. When the detection unit 119 detects the illegal access, the detection unit 119 notifies the existence of the illegal access to the virtual execution environment discarding unit 413.

The virtual execution environment discarding unit 413 discards the virtual execution environment when (based on the fact that) the detection unit 119 detects the illegal access. Since the virtual execution environment is discarded when the illegal access to the virtual execution environment is detected, the decrypted encryption data is prevented from being illegally acquired. Thus, the security can be improved.

Third Embodiment

The calculation server 500 of the present embodiment is the calculation device for converting the encryption system of the encryption data. The conversion of the encryption system can be the conversion to the encryption system having different key system and the conversion to the system having different calculation system in a certain encryption system, for example. More specifically, the conversion of the encryption system can be the conversion from the AES to the homomorphic encryption, the conversion from the common key encryption based retrievable encryption to the homomorphic encryption, the conversion from the GSW system to the BGV system in the fully homomorphic encryption, for example. (The reverse conversion is also possible in the above described examples.) The conversion of the encryption system is not limited to the above described examples.

Note that the homomorphic encryption is the cryptographic technology capable of performing the calculation of addition and multiplication while the data is encrypted to acquire the ciphertext of the calculation result, as described above. The homomorphic encryption includes various types such as "additive homomorphic encryption" capable of performing only the addition of the ciphertext, "multiparty homomorphic encryption" capable of performing only the multiplication, "fully homomorphic encryption" capable of performing both the addition and the multiplication and "somewhat homomorphic encryption" capable of performing limited numbers of times of calculation although both the addition and the multiplication are possible. In the following explanation of the embodiment, the type of the homomorphic encryption is not particularly limited.

Figure 9:
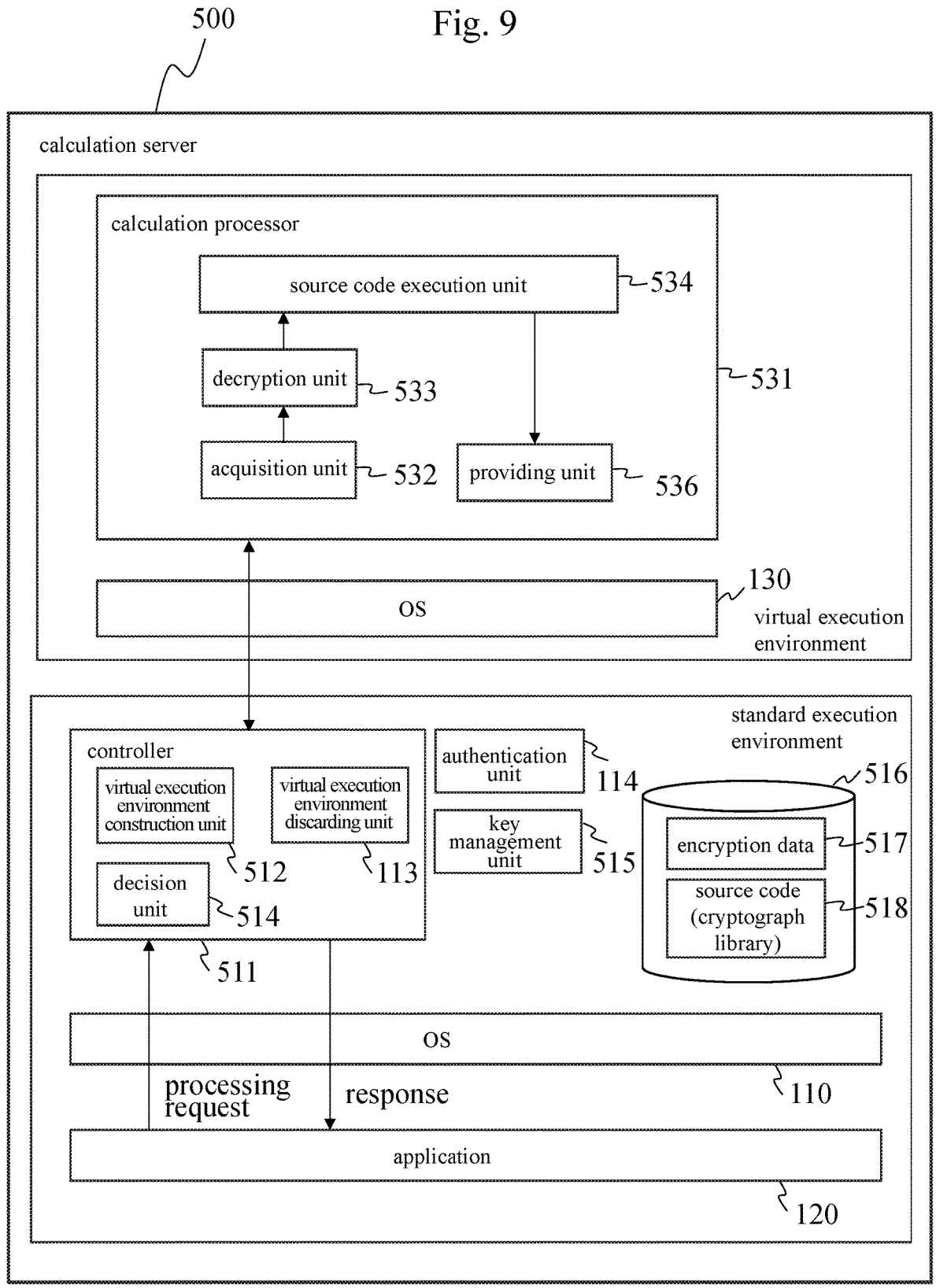
FIG. 9 is a functional block diagram showing an example of a function configuration of a calculation server 500.

FIG. 9 is a functional block diagram showing an example of a function configuration of the calculation server 500. As for the components having the same function as the calculation server 100 of the first embodiment shown in FIG. 2, the same reference signs are assigned and the repeated explanation is omitted.

A controller 511 includes a virtual execution environment construction unit 512, a virtual execution environment discarding unit 113 and a decision unit 514. The controller 511 receives a processing request of the processing of converting the encryption system of the encryption data 517 from an application 120 using a (later described) encryption data 517 and controls the processing.

The decision unit 514 decides (determines, judges) the encryption system of the encryption data 517. For example, the decision unit 514 can decide the encryption system based on the tag information indicating the encryption system included in the encryption data 517 or the decision unit 514 can acquire the information indicating the encryption system of the encryption data 517 from the application 120. It is also possible that the decision unit 514 includes the algorithm for automatically determining the encryption system by analyzing the encryption data 517. Note that the above described examples do not limit the decision method. Arbitrary methods can be used for the decision. For example, the encryption system is "DES," "RC4," "AES" and "common key encryption based retrievable encryption" which are the common key encryption scheme or "homomorphic encryption," "RSA" and "elliptic curve encryption" which are the public key encryption scheme. The encryption system is not limited to the above described examples. The cryptographic technology shown in "e-Government Recommended Ciphers List (CRYPTREC ciphers list)" developed by Ministry of Internal Affairs and Communications and Ministry of Economy can be also used.

When the decision unit 514 decides that the encryption system of the encryption data 517 is a predetermined encryption system, the decision unit 514 instructs the virtual execution environment construction unit 512 to construct the virtual execution environment protected from the standard execution environment. For example, the decision unit 514 preliminarily stores the table indicating the predetermined encryption system and decides the encryption system to be converted based on the table. For example, the decision unit 514 can include the algorithm for receiving the encryption data 517 and the source code (cryptograph library) 518 from the application 120, analyzing them and automatically determining the encryption system to be converted.

The virtual execution environment construction unit 512 constructs the virtual execution environment depending on a result of the decision of the decision unit 514.

A key management unit 515 has a key database storing the user ID and the system key used for encrypting the data in the information processing system 1 in association with each other. For example, it is also possible that the key management unit 515 generates the system key and registers it in the key database when the use registration of the user is performed. Note that the key management unit 515 can manage the system key which is not associated with the user. Thus, the system key can be associated with the user permitted to access the encryption data afterward. The system key can be the common key or a pair of a public key and a secret key (asymmetric keys). In any cases, the system key can be shared with the user by the same method as the key management unit 115 of the above described first embodiment or the method having the equivalent security level.

A storage unit 516 stores an encryption data 517 and a source code 518. As described above, the encryption data 517 is the data encrypted by various encryption systems such as "DES," "RC4," "AES," "retrievable encryption," "homomorphic encryption," "RSA" and "elliptic curve encryption," for example. The encryption data 517 contains the tag information indicating the encryption system.

The source code 518 is the source code containing the cryptograph library of various encryption systems. When the source code is executed, the plaintext data can be encrypted by the above descried encryption system, for example.

A calculation processor 531 includes an acquisition unit 532, a decryption unit 533, a source code execution unit 534 and a providing unit 536.

The acquisition unit 532 corresponds to the encryption data acquisition unit, the source code acquisition unit and the key acquisition unit. The acquisition unit 532 acquires the encryption data 517 from the storage unit 516 and acquires the system key from the key management unit 515. The system key is used for encrypting the encryption data 517 receiving the processing request. In addition, the acquisition unit 532 acquires the source code 518 which is the cryptograph library of the encryption system to be converted in accordance with the above described decision. Note that the acquisition of the system key is preferably performed by a secured method. For example, the encryption is performed by a session key.

The decryption unit 533 decrypts the encryption data 517 by the system key acquired by the acquisition unit 532.

The source code execution unit 534 executes the source code which is the cryptograph library on the decrypted encryption data 517. When executing the cryptograph library, the system key used in the decryption can be used and the system key different from the system key used in the decryption can be acquired from the key management unit 515 to use it. The system administrator or the user can arbitrarily specify the system key to be used.

The providing unit 536 provides the execution result executed by the source code execution unit 534 (i.e., the encryption data having the converted encryption system) to the standard execution environment and the like. For example, the encryption data having the converted encryption system can be stored in the storage unit 516 or outputted to the application 120 as a response to the processing request.

Explanation of Effects

As described above, in the present embodiment, the virtual execution environment protected from the standard execution environment is temporarily constructed and the encryption system of the encryption data is converted in the virtual execution environment. In the virtual execution environment, the encryption data is decrypted and the cryptograph library is executed on the decrypted encryption data as the source code. Namely, the decrypted encryption data is encrypted (re-encrypted) by the encryption system of the cryptograph library and provided to the standard execution environment. Since the data is decrypted and the encryption system is converted in the virtual execution environment protected from the standard execution environment, the access from the not reliable or not authenticated users can be prevented. Thus, security can be ensured.

Fourth Embodiment (Configuration of Secret Calculation System 1000)

Figure 10:
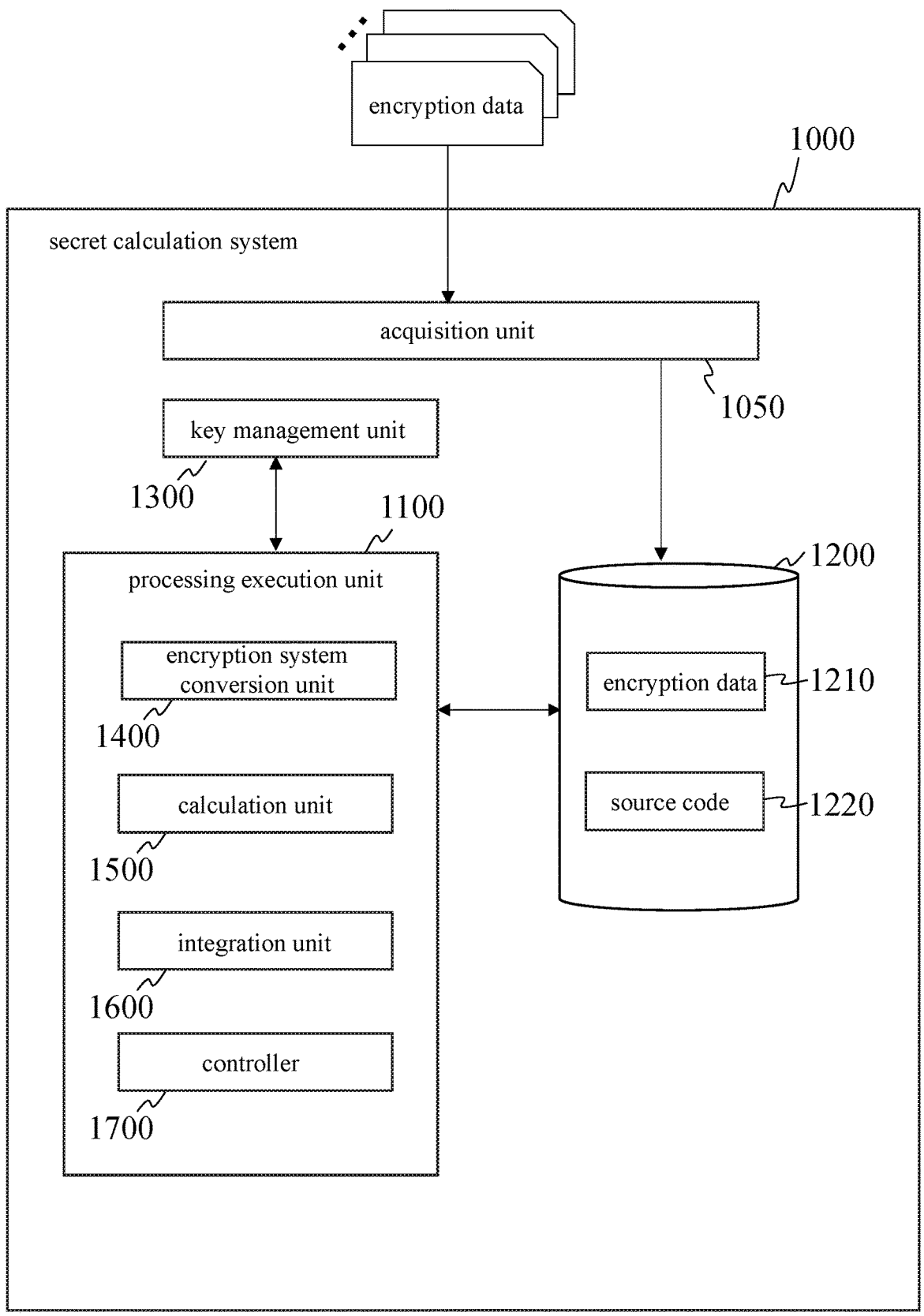
FIG. 10 is a drawing showing a configuration of a secret calculation system 1000.

FIG. 10 is a drawing showing a configuration of the secret calculation system 1000 of the present embodiment. With reference to FIG. 10, the configuration of the secret calculation system 1000 of the fourth embodiment will be explained.

The secret calculation system 1000 of the present embodiment is the information processing system for temporarily constructing the virtual execution environment and performing the processing on the encrypted data. Thus, the calculation is executed efficiently while ensuring security. The secret calculation system 1000 includes an acquisition unit 1050, a storage unit 1200, a key management unit 1300 and a processing execution unit 1100. The secret calculation system 1000 includes a (not illustrated) authentication unit which authenticates whether or not the user is a secure user who can securely access the virtual execution environment. However, the detailed explanation of the functions of the authentication unit is omitted since the functions are same as those of the above described first embodiment and the like. Note that the authentication unit can be included in an encryption system conversion unit 1400, a calculation unit 1500 and an integration unit 1600 which are explained later.

The acquisition unit 1050 acquires the encryption data and stores it in an encryption data 1210 of the storage unit 1200. The acquired encryption data is encrypted by various kinds of encryption systems based on the system key shared by the later described key management unit 1300 and a (not illustrated) terminal or the like using the secret calculation system 1000 or the system key managed by the key management unit 1300. The encryption system will be described later.

The storage unit 1200 stores the encryption data encrypted by the system key. The storage unit 1200 includes an encryption data 1210 and a source code 1220.

The encryption data 1210 is the data encrypted by "DES," "RC4," "AES" and "common key encryption based retrievable encryption" which are the common key encryption scheme or "homomorphic encryption," "RSA" and "elliptic curve encryption" which are the public key encryption scheme, for example. The encryption system is not limited to the above described examples. The cryptographic technology shown in "e-Government Recommended Ciphers List (CRYPTREC ciphers list)" developed by Ministry of Internal Affairs and Communications and Ministry of Economy can be also used. The encryption data 1210 can include the above described various types of encryption data. In addition, the encryption data 1210 can be stored in the storage unit 1200 or deleted from the storage unit 1200 in accordance with the instruction of the authorized or permitted user.

The source code 1220 is the source code for the cryptograph library or the calculation and the integration of the data. The source code 1220 is the program executed on the data (plaintext data) formed by decrypting the encryption data 1210 by the system key. The cryptograph library is used for the homomorphic encryption, the AES and the retrievable encryption, for example. The processing execution unit 1100 (later described virtual execution environment construction units 1412, 1512, 1612) can construct the virtual execution environment while containing (preinstalling) the above described cryptograph library for the cryptograph library or the calculation and the integration of the data in the virtual execution environment.

The key management unit 1300 has a key database storing the user ID using the secret calculation system 1000 and the system key used for encrypting the data in the secret calculation system 1000 in association with each other and controls the system key. For example, it is also possible that the key management unit 1300 generates the system key and registers it in the key database when the use registration of the user is performed. The system key can be the common key or a pair of a public key and a secret key (asymmetric keys). In addition, a plurality of system keys can be assigned to one user. Furthermore, the key management unit 1300 can manage the system key not associated with the user. Thus, the system key can be associated with the user authorized to access the encryption data afterward. It is also possible that the key management unit 1300 associates another system key with the system key and the system key (decryption key) is decrypted by the another system key which is associated with the system key (decryption key) used for the decryption in the virtual execution environment.

In any cases, the system key can be shared with the user by the same method as the key management unit 115 of the above described first embodiment or the method having the equivalent security level (e.g., the authentication by the authentication unit). In addition, the system key can be registered in the key database of the key management unit 1300 by the method generated by the user side via the network NW while ensuring security.

The processing execution unit 1100 temporarily constructs the virtual execution environment protected from the standard execution environment, decrypts the encryption data 1210 in the virtual execution environment based on the system key acquired from the key management unit 1300, performs a predetermined processing is performed in the virtual execution environment and the execution result is stored in the storage unit 1200. The processing execution unit 1100 includes an encryption system conversion unit 1400, a calculation unit 1500, an integration unit 1600 and a controller 1700.

The encryption system conversion unit 1400 performs the processing of converting the encryption system of the encryption data acquired by the acquisition unit 1050. The conversion of the encryption system is executed by decrypting the encryption data 1210 in the virtual execution environment protected from the standard execution environment based on the system key acquired by the key management unit 1300. The details of the processing will be explained in FIG. 11.

The calculation unit 1500 performs the processing related to a predetermined calculation on the encryption data, encrypts a result of the calculation and stores it in the encryption data 1210 of the storage unit 1200. The calculation process is executed by decrypting the encryption data 1210 in the virtual execution environment based on the system key acquired by the key management unit 1300. The details of the processing will be explained in FIG. 12.

The integration unit 1600 performs the processing of integrating a plurality of decrypted encryption data into one data, encrypts the integrated result and stored it in the encryption data 1210 of the storage unit 1200. The details of the processing will be explained in FIG. 13.

The controller 1700 controls at least one of the encryption system conversion unit 1400, the calculation unit 1500 and the integration unit 1600 to execute the requested calculation processing in accordance with a calculation processing request.

In the secret calculation system 1000 of the present embodiment, the acquisition unit 1050, the storage unit 1200, the key management unit 1300 and the processing execution unit 1100 can be formed as one device (computer: PC or virtual space). Alternatively, any one or more of the acquisition unit 1050, the storage unit 1200, the key management unit 1300 and the processing execution unit 1100 can be simultaneously included in one device. For example, the acquisition unit 1050, the storage unit 1200 and the processing execution unit 1100 can be included in one device. Note that the key management unit 1300 and the storage unit 1200 are preferably formed as separated devices for security reasons. However, the components of the secret calculation system can be arbitrarily combined as long as the functions explained in the above described embodiments can be achieved.

In addition, a plurality of functional elements in the present embodiments can be partly combined. Alternatively, one invention of the present embodiment can be partly used. Alternatively, the present embodiments can be used in any combinations as a whole or as a part.

(Function Configuration of Encryption System Conversion Unit 1400)

Figure 11:
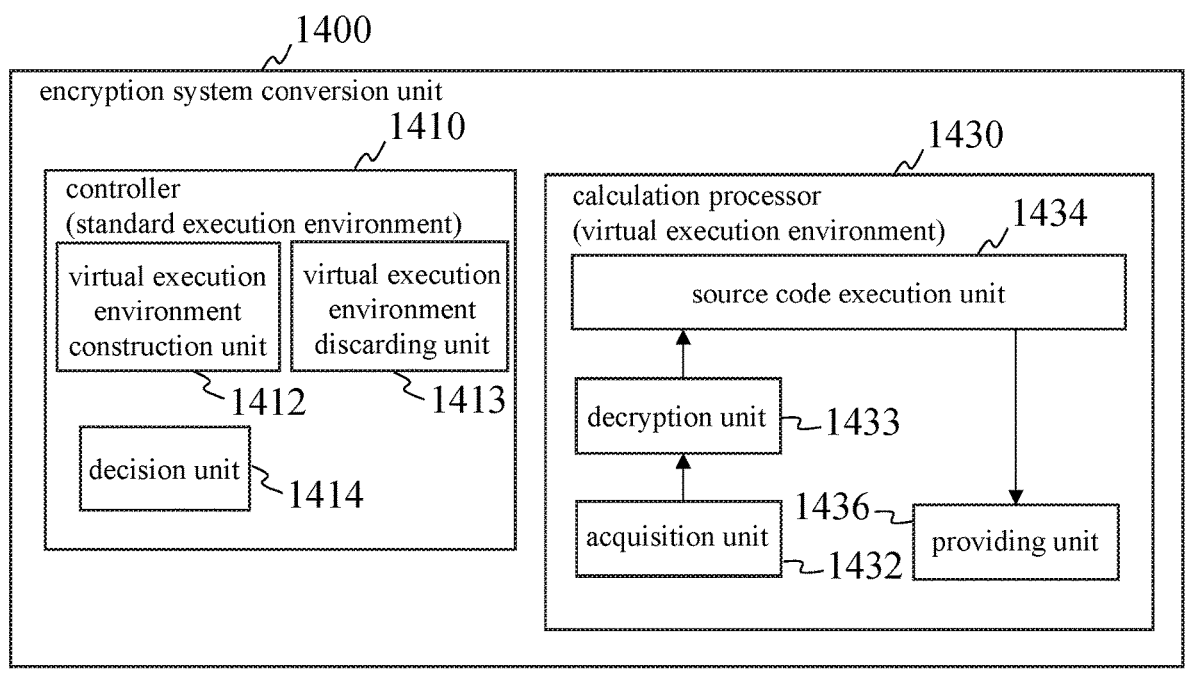
FIG. 11 is a functional block diagram showing an example of a function configuration of an encryption system conversion unit 1400.

FIG. 11 is a functional block diagram showing an example of the function configuration of the encryption system conversion unit 1400. With reference to FIG. 11, an example of the function configuration of the encryption system conversion unit 1400 will be explained. In the following explanation, the explanation of a (not illustrated) OS or the like installed on the device which functions as the encryption system conversion unit 1400 is omitted since the explanation is same as the first embodiment.

A controller 1410 includes a virtual execution environment construction unit 1412, a virtual execution environment discarding unit 1413 and a decision unit 1414. The controller 1410 receives the processing request for converting the encryption system of the encryption data 1210 from a (not illustrated) application using the encryption data 1210 and controls the processing. Note that the encryption data 1210 is not limited to the data stored in the storage unit 1200. The encryption data 1210 can be the encryption data acquired by the acquisition unit 1050.

The decision unit 1414 decides the encryption system of the encryption data 1210. The explanation of the decision method is omitted since it is same as the above described decision unit 514.

When the decision unit 1414 decides that the encryption system of the encryption data 1210 is a predetermined encryption system, the decision unit 1414 instructs the virtual execution environment construction unit 1412 to construct the virtual execution environment protected from the standard execution environment. For example, the decision unit 1414 preliminarily stores the table indicating the predetermined encryption system and decides the encryption system to be converted based on the table. The decision unit 1414 can store the table indicating the encryption system to be converted. For example, the table can include the correspondence from AES to the homomorphic encryption or the correspondence from the common key encryption based retrievable encryption to the homomorphic encryption. For example, the decision unit 1414 can include the algorithm for receiving the encryption data 1210 and the source code (cryptograph library) 1220 from a (not illustrated) application using the encryption data 1210, analyzing them and automatically determining the encryption system to be converted.

The virtual execution environment construction unit 1412 constructs the virtual execution environment depending on the decision of the decision unit 1414. A (not illustrated) OS is installed on the virtual execution environment and the OS includes a calculation processor 1430. In addition, the virtual execution environment discarding unit 1413 discards (eliminates) the above described virtual execution environment similar to the virtual execution environment discarding unit 113 of the first embodiment.

The calculation processor 1430 includes an acquisition unit 1432, a decryption unit 1433, a source code execution unit 1434 and a providing unit 1436.

The acquisition unit 1432 corresponds to the encryption data acquisition unit, the source code acquisition unit and the key acquisition unit. The acquisition unit 1432 acquires the encryption data 1210 from the storage unit 1200 and acquires the system key from the key management unit 1300. In addition, the acquisition unit 1432 acquires the source code 1220 which is the cryptograph library of the encryption system to be converted in accordance with the above described decision of the decision unit 1414. Note that the above described system key is the system key used for encrypting the acquired encryption data 1210 and the system key used for the later described source code 1220 (cryptograph library).

The decryption unit 1433 decrypts the encryption data 1210 by the system key acquired by the acquisition unit 1432.

The source code execution unit 1434 executes the source code which is the cryptograph library of the encryption system to be converted on the decrypted encryption data 1210. Namely, the decrypted encryption data 1210 is re-encrypted. The system key used at this time can be the system key preliminarily shared (managed) by the key management unit 1300 with the authenticated user from which the encryption data is transmitted. Alternatively, the system key can be a not shared (managed) system key. Note that the key management unit 1300 can newly share (manage) the system key which is not shared. When the key management unit 1300 newly generates the system key for the re-encryption, the key management unit 1300 can newly share (manage) the newly generated system key. When a key generation unit (not illustrated in FIG. 11) of the calculation processor 1430 newly generates the system key and used it for the re-encryption, the later described providing unit 1436 can provide the newly generated system key to the key management unit 1300 so that the key management unit 1300 manages the newly generated system key.

The providing unit 1436 provides the execution result (i.e., the encryption data having the converted encryption system) executed by the source code execution unit 1434 to the standard execution environment and the like. For example, the encryption data having the converted encryption system can be stored in the encryption data 1210 of the storage unit 1200 or outputted to a (not illustrated) application as a response to the processing request. In addition, the system key acquired from the key management unit 1300 by the acquisition unit 1432 and used for executing the source code by the source code execution unit 1434 is discarded when the virtual execution environment discarding unit 1413 discards the virtual execution environment.

(Function Configuration of Calculation Unit 1500)

Figure 12:
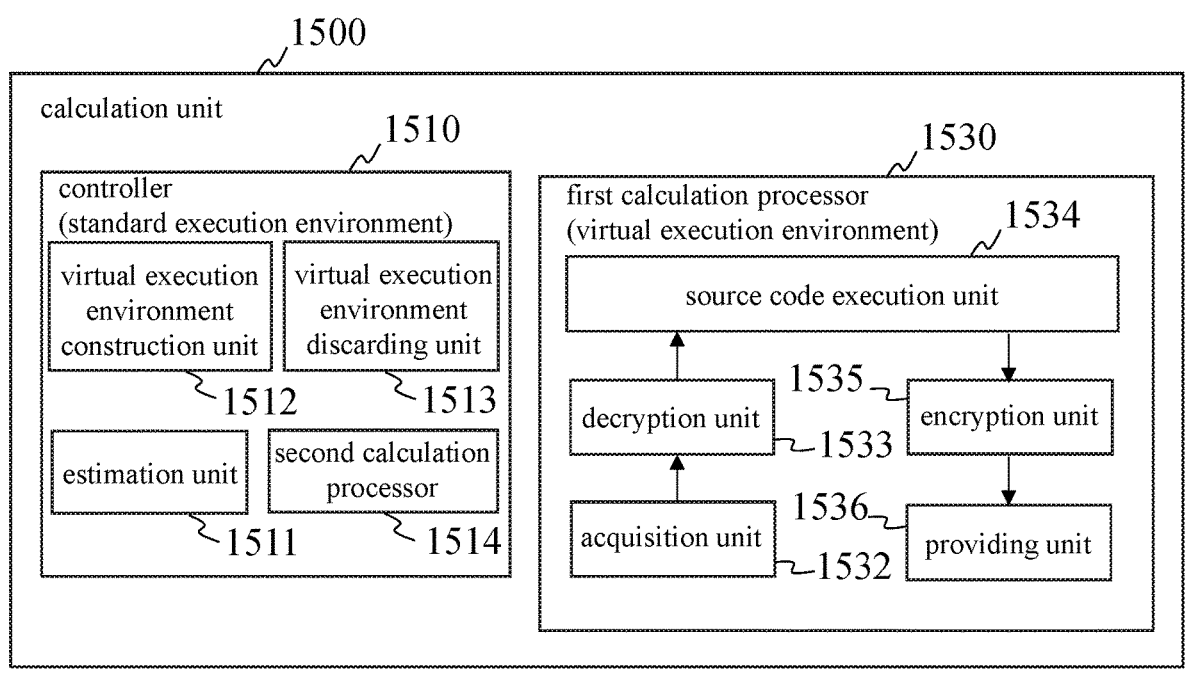
FIG. 12 is a functional block diagram showing an example of a function configuration of a calculation unit 1500.

FIG. 12 is a functional block diagram showing an example of the function configuration of the calculation unit 1500. With reference to FIG. 12, an example of the function configuration of the calculation unit 1500 will be explained. In the following explanation, the explanation of a (not illustrated) OS or the like installed on the device which functions as the calculation unit 1500 is omitted since the explanation is same as the first embodiment.

A controller 1510 includes an estimation unit 1511, a virtual execution environment construction unit 1512, a virtual execution environment discarding unit 1513 and a second calculation processor 1514. The controller 1510 receives the calculation processing request of the encryption data 1210 from a (not illustrated) application using the encryption data 1210 and controls the calculation process.

The estimation unit 1511 functions as a decision unit configured to decide whether or not the processing of the encryption data 1210 satisfies a predetermined condition. For example, the estimation unit 1511 estimates the calculation amount of the encryption data 1210 as the predetermined condition based on the requested calculation process. When the estimation unit 1511 decides that the calculation amount is a predetermined calculation amount or more (i.e., the predetermined condition is satisfied), the estimation unit 1511 instructs the virtual execution environment construction unit 1512 to construct the virtual execution environment. The estimation unit 1511 calculates the calculation amount in accordance with the type (e.g., calculation process such as comparison) of the requested calculation, for example.

It is also possible that the estimation unit 1511 decides whether or not the virtual execution environment is constructed by totally considering the resource (e.g., memory, CPU, parallel server) of the secret calculation system 1000, the time setting before finishing the calculation processing set by the user and the like as the predetermined condition in addition to the above described calculation amount. It is also possible that the estimation unit 1511 decides whether or not the virtual execution environment is constructed by managing the standard execution time for each of the calculation processes in the corresponding table or the like and referring to the execution time.

It is also possible that the estimation unit 1511 instructs the virtual execution environment construction unit 1512 to construct the virtual execution environment when the estimation unit 1511 decides that the encryption data 1210 is the predetermined encryption data as the predetermined condition. The predetermined encryption data is the data encrypted by the homomorphic encryption, for example. Although the homomorphic encryption enables the calculation in an encrypted state, the encryption size is extremely large and the calculation amount is huge. Thus, the processing can be accelerated in a secured state by decrypting the encrypted data and calculating the plaintext data in the virtual execution environment as described later.

In addition, the predetermined encryption data can be the data encrypted by the AES or the retrievable encryption, for example. In the data encrypted by the above described encryption system, it is difficult to perform the calculation such as a statistic in the encrypted state. Thus, similar to the above described case, the processing can be accelerated in a secured state by decrypting the encrypted data and calculating the plaintext data in the virtual execution environment.

The virtual execution environment construction unit 1512 constructs the virtual execution environment based on the instruction of the estimation unit 1511. A (not illustrated) OS is installed on the virtual execution environment and the OS includes a first calculation processor 1530.

The virtual execution environment discarding unit 1513 discards (eliminates) the above described virtual execution environment similar to the virtual execution environment discarding unit 113 of the first embodiment.

When the estimation unit 1511 decides that the encryption data 1210 does not satisfy the predetermined condition (e.g., the estimated calculation amount is not the predetermined calculation amount or more), the second calculation processor 1514 performs the requested calculation processing without decrypting the encryption data 1210. When the encryption data 1210 of the processing request is the homomorphic encryption, for example, the calculation can be executed in the encrypted state. Thus, the calculation result can be acquired while keeping confidentiality even in the standard execution environment. When the encryption data 1210 is the AES, the processing such as full-text match search and the like can be performed. The second calculation processor 1514 can acquire the secret calculation algorithm for calculating the encryption data of the homomorphic encryption from the source code 1220 of the storage unit 1200.

The first calculation processor 1530 includes an acquisition unit 1532, a decryption unit 1533, a source code execution unit 1534, an encryption unit 1535 and a providing unit 1536.

The acquisition unit 1532 corresponds to the encryption data acquisition unit, the source code acquisition unit and the key acquisition unit. The acquisition unit 1532 acquires the encryption data 1210 and the source code 1220 from the storage unit 1200 and acquires the system key from the key management unit 1300. The system key is used for encrypting the encryption data 1210 of the processing request. Note that the acquisition of the system key is preferably performed by a secured method. For example, the encryption is performed by a session key.

The decryption unit 1533 decrypts the encryption data 1210 by the system key acquired by the acquisition unit 1532.

The source code execution unit 1534 executes the source code 1220 on the decrypted encryption data 1210. The source code 1220 is a calculation algorithm for processing the plaintext data. For example, the source code 1220 is the algorithm for performing the data analysis of the key data, the generation of the data distribution and the cluster, the conditional branch or the decision of the conditional branch for efficient data analysis, the generation of the sorted data and the generation of the learning model on the decrypted encryption data 1210.

The encryption unit 1535 encrypts the calculation result executed by the source code execution unit 1534. The encryption unit 1535 can perform the encryption based on the system key acquired by the acquisition unit 1532 or perform the encryption based on the different system key different from the above described system key instead of the above described system key. For example, it is possible that the key management unit 1300 generates the system key and a different key (system key) different from the system key and the acquisition unit 1532 acquires these keys and transfers them to the encryption unit 1535. In addition, the acquisition unit 1532 can acquire the key different from the system key generated in the key generation unit (not illustrated in FIG. 12) of the first calculation processor 1530 and transfer it to the encryption unit 1535. The above described newly generated key can be provided from the later described providing unit 1536 to the key management unit 1300 so that the key management unit 1300 manages the newly generated key. Consequently, for example, the above described different key is given only to the user permitted to access the calculation result. Thus, the access right to the calculation result can be managed.

The providing unit 1536 provides the encrypted calculation result to the standard execution environment and the like. For example, the encrypted calculation result can be stored in the storage unit 1200 or outputted as a response to the processing request of a (not illustrated) application. Note that the providing unit 1536 provides the system key generated in the above described key generation unit to the key management unit 1300. In addition, the system key acquired from the key management unit 1300 by the acquisition unit 1532 and used for the encryption by the encryption unit 1535 is discarded when the virtual execution environment discarding unit 1513 discards the virtual execution environment.

(Function Configuration of Integration Unit 1600)

Figure 13:
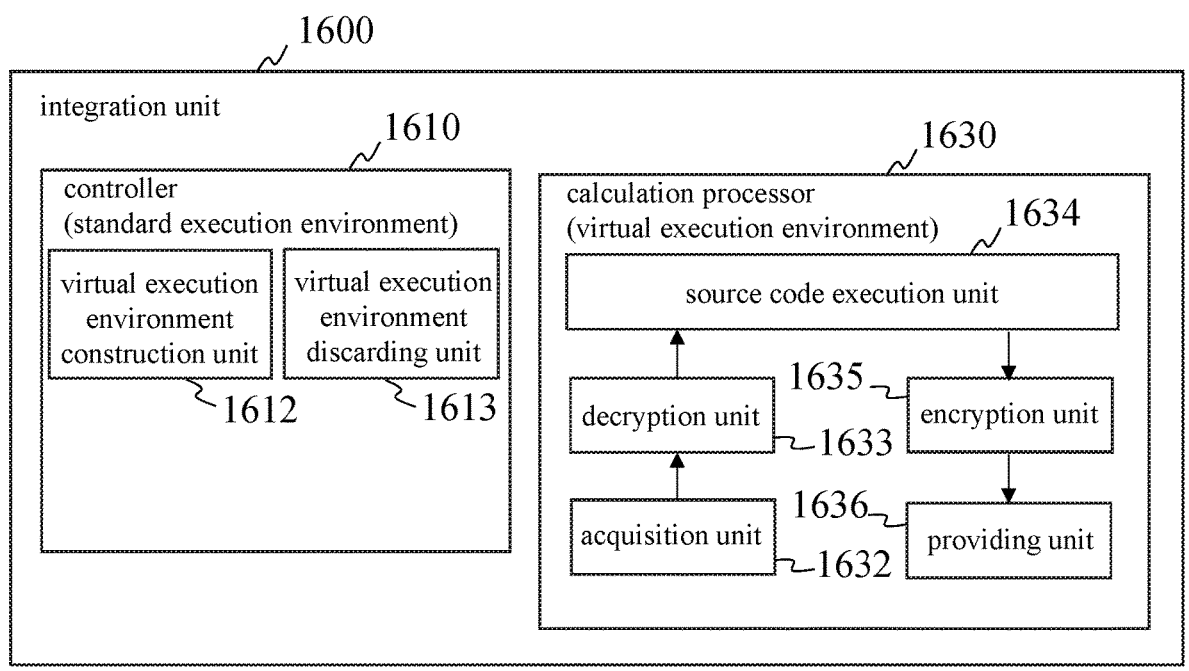
FIG. 13 is a functional block diagram showing an example of a function configuration of an integration unit 1600.

FIG. 13 is a functional block diagram showing an example of the function configuration of the integration unit 1600. With reference to FIG. 13, an example of the function configuration of the integration unit 1600 will be explained. In the following explanation, the explanation of a (not illustrated) OS or the like installed on the device which functions as the integration unit 1600 is omitted since the explanation is same as the first embodiment.

A controller 1610 includes a virtual execution environment construction unit 1612 and a virtual execution environment discarding unit 1613. The controller 1610 receives an integration processing request of the encryption data 1210 from a (not illustrated) application using the encryption data 1210 and controls the integration process. The virtual execution environment construction unit 1612 constructs the virtual execution environment in accordance with the integration processing request. A (not illustrated) OS is installed on the virtual execution environment and the OS includes a calculation processor 1630.

The virtual execution environment discarding unit 1513 discards (eliminates) the above described virtual execution environment similar to the virtual execution environment discarding unit 113 of the first embodiment.

The calculation processor 1630 includes an acquisition unit 1632, a decryption unit 1633, a source code execution unit 1634, an encryption unit 1635 and a providing unit 1636.

The acquisition unit 1632 corresponds to the encryption data acquisition unit, the source code acquisition unit and the key acquisition unit. The acquisition unit 1632 acquires a plurality of encryption data 1210 and source code 1220 to be integrated from the storage unit 1200 and acquires the system key from the key management unit 1300. The above described system key is the system key used for encrypting the encryption data 1210 of the processing request. Note that the acquisition of the system key is preferably performed by a secured method. For example, the encryption is performed by a session key. In addition, the source code 1220 is the algorithm for performing the processing of integrating a plurality of data into one data.

The decryption unit 1633 decrypts the encryption data 1210 by the system key acquired by the acquisition unit 1632.

The source code execution unit 1634 executes the source code 1220 which is the algorithm for performing the integration processing on the plurality of decrypted encryption data 1210 to integrate the data into one data. When the source code is executed, two or more database tables having the common key are horizontally or vertically connected using the common key as "integration key" and integrated into one database table (shown in FIG. 15), for example.

The encryption unit 1635 encrypts the integration result executed by the source code execution unit 1634. The encryption unit 1635 can perform the encryption based on the system key acquired by the acquisition unit 1632 or perform the encryption based on the different system key different from the above described system key instead of the above described system key. For example, it is possible that the key management unit 1300 generates the system key and a different key (system key) different from the system key and the acquisition unit 1632 acquires these keys and transfers them to the encryption unit 1635. It is also possible that the acquisition unit 1632 acquires a different key which is different from the system key generated in the key generation unit (not illustrated in FIG. 13) of the calculation processor 1630 and transmits it to the encryption unit 1635. The above described newly generated key can be provided from the later described providing unit 1636 to the key management unit 1300 so that the key management unit 1300 manages the newly generated key. Consequently, for example, the above described different key is given only to the user permitted to access the integration result. Thus, the access right to the integration result can be managed.

The providing unit 1636 provides the encrypted calculation result to the standard execution environment and the like. For example, the encrypted calculation result can be stored in the storage unit 1200 or outputted as a response to the processing request of a (not illustrated) application. Note that the providing unit 1636 provides the system key generated in the above described key generation unit to the key management unit 1300.

In addition, the system key acquired by the acquisition unit 1632 and used for the encryption by the encryption unit 1635 is discarded when the virtual execution environment discarding unit 1613 discards the virtual execution environment.

(Flow of Processing in Secret Calculation System 1000)

Figure 14:
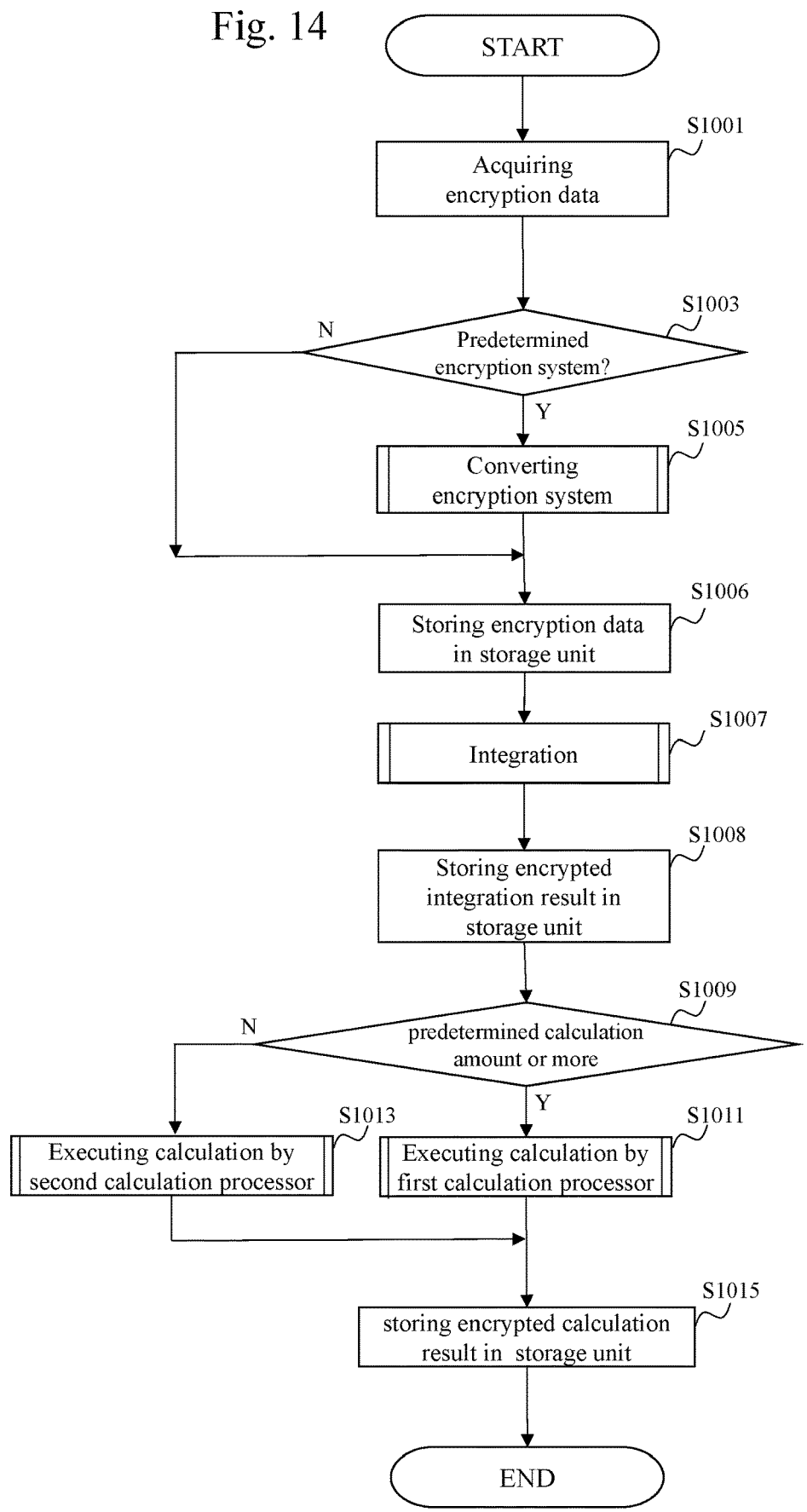
FIG. 14 is a flow chart showing an example of the processing in the secret calculation system 1000.

FIG. 14 is a flow chart showing an example of the processing in the secret calculation system 1000. With reference to FIG. 14, the processing of the encryption data in the secret calculation system 1000 in accordance with the calculation processing request will be explained. Note that the order of the processing steps shown in FIG. 14 is merely an example. It goes without saying that the processing performed in the secret calculation system 1000 is not limited to the order explained below. Namely, although the processing is performed in the order of "conversion of encryption system," "integration" and "calculation" in FIG.

14, the processing can be performed in an arbitrary combination and an arbitrary order in accordance with the content of the processing request. For example, the processing can be performed in the order of "integration," "conversion of encryption system" and "calculation," the order of "conversion of encryption system," "calculation" and "integration," the order of "conversion of encryption system," "integration" and "conversion of encryption system," the order of "integration" and "calculation," the order of "conversion of encryption system" and "calculation," the order of "calculation," "calculation" and "integration." It is also possible that the secret calculation system 1000 performs only "conversion of encryption system" only "integration" or only "calculation" in accordance with the content of the processing request.

In FIG. 14, the explanation will be made in condition that the key management unit 1300 shares the system key with the authenticated or permitted user of the system.

The processing of Step S1003 to S1006 corresponds to the processing executed in the encryption system conversion unit 1400. The processing of Step S1007 to S1008 corresponds to the processing executed in the integration unit 1600. The processing of Step S1009 to S1015 corresponds to the processing executed in the calculation unit 1500. The controller 1700 controls the encryption system conversion unit 1400, the calculation unit 1500 and the integration unit 1600 to perform the calculation processing in accordance with the calculation processing request.

In Step S1001, the acquisition unit 1050 acquires the encryption data. In addition, the acquisition unit 1050 also acquires the calculation processing request to the encryption data.

In Step S1003, the encryption system conversion unit 1400 decides whether or not the encryption system of the acquired encryption data is the predetermined encryption system. For example, it is possible that an administrator preliminarily specifies the table of the encryption system indicating the predetermined encryption system and the decision is made based on the table. When the encryption system conversion unit 1400 decides that the encryption system is the predetermined encryption system (Y in Step S1003), the virtual execution environment construction unit 1412 constructs the virtual execution environment and the calculation processor 1430 converts the encryption system of the encryption data in Step S1005. After the conversion is finished, the virtual execution environment discarding unit 1413 discards the virtual execution environment. The processing in the calculation processor 1430 has been already explained in FIG. 11.

When the encryption system conversion unit 1400 decides that the encryption system is not the predetermined encryption system (N in Step S1003) (i.e., there is no need to convert the encryption system), the process is advanced to Step S1006.

In Step S1006, the encryption system conversion unit 1400 stores the encryption data whose encryption system is converted in Step S1005 or the encryption system whose encryption system is decided to be encrypted by the other systems than the predetermined encryption system in Step S1003 in the encryption data 1210 of the storage unit 1200.

In Step S1007, the integration unit 1600 acquires a plurality of encryption data 1210 from the storage unit 1200 and decrypts the encryption data in the virtual execution environment. Then, the decrypted encryption data is integrated into one data and the integration result is encrypted.

In Step S1008, the integration unit 1600 stores the encrypted integration result in the encryption data 1210 of the storage unit 1200.

In Step S1009, the calculation unit 1500 estimates the calculation amount of the calculation of the encryption data 1210 receiving the processing request and decides whether or not the calculation amount is the predetermined amount or more (i.e., whether or not the predetermined condition is satisfied). The calculation result can be decided based on the type of the calculation receiving the processing request, for example.

When the calculation unit 1500 decides that the calculation amount is the predetermined amount or more (Y in Step S1009), the virtual execution environment construction unit 1512 constructs the virtual execution environment and the first calculation processor 1530 executes the calculation in Step S1011. After the calculation is finished, the virtual execution environment discarding unit 1513 discards the virtual execution environment. The processing in the first calculation processor 1530 has been already explained in FIG. 12.

When the calculation unit 1500 decides that the calculation amount is not the predetermined amount or more (N in Step S1009), the calculation is executed by the second calculation processor 1514 in Step S1013. Namely, when the calculation amount of the encryption data of the homomorphic encryption or the like receiving the processing request is estimated to be the predetermined calculation amount or less, the calculation is executed in the encrypted state encrypted by the homomorphic encryption. When the calculation amount is the predetermined calculation amount or more, the calculation is executed while the encryption data is decrypted in the virtual execution environment protected from the standard execution environment. Thus, the calculation speed can be increased while ensuring security.

In Step S1015, the calculation unit 1500 stores the encrypted calculation result in a calculation result 1230 of the storage unit 1200 and the processing is finished.

Explanation of Effect

As described above, in the secret calculation system of the present embodiment, the processing of the encrypted data is performed while temporarily constructing the virtual execution environment. Thus, the calculation can be executed efficiently while ensuring security. Namely, the encryption data is decrypted and the processing is performed on the plaintext data in the virtual execution environment protected from the standard execution environment. Thus, the calculation can be executed safely and quickly.

Variation Example of Fourth Embodiment

In the secret calculation system 1000, the processing execution unit 1100 constructs the virtual execution environment and the encryption data 1210 is decrypted in the virtual execution environment based on the system key acquired from the key management unit 1300. The virtual execution environment can be discarded together with the decrypted encryption data without reencrypting the processing result or providing the processing result to the standard execution environment. Namely, the encryption data is decrypted in the temporarily constructed virtual execution environment and only the permitted user or the like can be accessed to the virtual execution environment to visually confirm or analyze the data, for example. Consequently, the confirmation and the analysis of the data are possible in a secured state and the analysis result or the like can be prevented from being outputted as the data to the standard execution environment.

The above described embodiments can be performed in the form of an information processing program executed in the computer (hardware) and the information processing device in addition to the form of the system.

The above described embodiments can be carried out in other various forms. Various omission, replacement and change can be applied within the range not deviating from the summary of the present invention. The embodiments and the variation of them are included in the range and summary of the present invention and also included in the invention described in the claims and the range equivalent to them.

DESCRIPTION OF THE REFERENCE NUMERALS

1: information processing system; 100, 400, 500: calculation server; 200: registration server; 300: terminal; 110, 130: OS; 111, 512, 1410, 1510: controller; 112, 512, 1412, 1512, 1612: virtual execution environment construction unit; 113, 413, 1413, 1513, 1613: virtual execution environment discarding unit; 114: authentication unit; 115, 515, 1300: key management unit; 116, 516, 1200: storage unit; 117, 517, 1210: encryption data; 118, 518, 1220: source code; 119: detection unit; 120: application; 131, 531, 1430, 1630: calculation processor; 132, 532, 1432, 1532, 1632: acquisition unit; 133, 533, 1433, 1533, 1633: decryption unit; 134, 534, 1434, 1534, 1634: source code execution unit; 135, 1535, 1635: encryption unit; 136, 536, 1436, 1536, 1636: providing unit; 201: ID generating unit; 202: authentication information generating unit; 1000: secret calculation system; 1100: acquisition unit; 1230: calculation result; 1400: encryption system conversion unit; 1414: decision unit; 1500: calculation unit; 1511: estimation unit; 1514: second calculation processor; 1530: first calculation processor; 1600: integration unit; 1700: controller

The invention claimed is:

1. An information processing system, comprising:
a key management device configured to manage a system key;
a storage device configured to store an encryption data encrypted by the system key;
a decision device configured to make a decision whether or not a processing of the encryption data satisfies a predetermined condition;
a virtual execution environment construction device configured to construct a virtual execution environment protected from a standard execution environment; and
a calculation device configured to perform the processing, wherein
the virtual execution environment construction device constructs the virtual execution environment depending on the decision,
the calculation device includes:
a first calculation processor configured to perform the processing in the virtual execution environment; and
a second calculation processor configured to perform the processing in the standard execution environment,
the first calculation processor performs the processing by decrypting the) encryption data based on the system key acquired from the key management device,
the second calculation processor performs the processing without decrypting the encryption data, and
the first calculation processor and the second calculation processor perform the processing on the encryption data depending on the decision.

2. The information processing system according to claim 1, wherein
the first calculation processor is configured to perform a predetermined calculation and encrypt a result of the predetermined calculation as the processing.

3. The information processing system according to claim 1, further comprising:
an encryption system conversion device configured to encrypt the decrypted encryption data as the processing by an encryption system different from the encryption system of the encryption data used before the encryption data is decrypted.

4. The information processing system according to claim 1, further comprising:
an integration device configured to integrate a plurality of decrypted encryption data into one and encrypt an integration result as the processing.

5. The information processing system according to claim 1, further comprising:
an encryption system conversion device configured to encrypt the decrypted encryption data as the processing by an encryption system different from the encryption system of the encryption data used before the encryption data is decrypted; and
an integration device configured to integrate a plurality of decrypted encryption data into one and encrypt an integration result as the processing.

6. The information processing system according to claim 5, further comprising:
a controller configured to control at least one of the calculation device, the encryption system conversion device and the integration device to perform a requested processing.

7. The information processing system according to claim 6, wherein
the encryption system conversion device and the integration device construct the virtual execution environment and decrypt the encryption data in the virtual execution environment based on the system key acquired from the key management device to perform the processing.

8. The information processing system according to claim 1, further comprising:
a virtual execution environment discarding device configured to discard the virtual execution environment.

9. An information processing device, comprising:
a key management device configured to manage a system key;
a storage device configured to store the encryption data encrypted by the system key;
a decision device configured to make a decision whether or not a processing of the encryption data satisfies a predetermined condition;
a virtual execution environment construction device configured to construct a virtual execution environment protected from a standard execution environment; and
a calculation device configured to perform the processing, wherein
the virtual execution environment construction device constructs the virtual execution environment depending on the decision,
the calculation device includes:
a first calculation processor configured to perform the processing in the virtual execution environment; and a second calculation processor configured to perform the processing in the standard execution environment, the first calculation processor performs the processing by decrypting the encryption data based on the system key acquired from the key management device, the second calculation processor performs the processing without decrypting the encryption data, and the first calculation processor and the second calculation processor perform the processing on the encryption data depending on the decision.

10. An information processing method executed in a computer having a controller and a storage device, the method comprising:

a step of managing a system key by the controller;

a step of storing an encryption data encrypted by the system key in the storage device;

a step of making a decision whether or not a processing of the encryption data satisfies a predetermined condition by the controller;

a step of constructing a virtual execution environment protected from a standard execution environment by the controller; and a step of performing the processing by the controller, wherein the step of constructing the virtual execution environment includes a step of constructing the virtual execution environment depending on the decision by the controller, the step of performing the processing includes:

a first step of performing the processing in the virtual execution environment by the controller; and a second step of performing the processing in the standard execution environment by the controller, the first step is a step of performing the processing by decrypting the encryption data based on the system key acquired from the key management device by the controller, the second step is a step of performing the processing without decrypting the encryption data by the controller, and the controller performs the processing of the encryption data in the first step or the second step depending on the decision.

* * * * *